US008725616B2

(12) United States Patent
Schneider

(10) Patent No.: US 8,725,616 B2
(45) Date of Patent: May 13, 2014

(54) METHOD FOR MANAGING A HOME EQUITY SALES PROGRAM

(75) Inventor: Nelson Schneider, Solvang, CA (US)

(73) Assignee: Home Equity Securities, LLC, Dover, DE (US)

(*) Notice: Subject to any disclaimer, the term of this patent is extended or adjusted under 35 U.S.C. 154(b) by 1337 days.

(21) Appl. No.: 12/077,404

(22) Filed: Mar. 19, 2008

(65) Prior Publication Data

US 2008/0183617 A1  Jul. 31, 2008

(51) Int. Cl.
*G06Q 40/00* (2012.01)

(52) U.S. Cl.
USPC .......................................... 705/36 R; 705/35

(58) Field of Classification Search
USPC ...................................................... 705/36 R
See application file for complete search history.

(56) References Cited

U.S. PATENT DOCUMENTS

| 5,644,726 | A | 7/1997 | Oppenheimer |
| 5,673,402 | A | 9/1997 | Ryan et al. |
| 5,802,501 | A | 9/1998 | Graff |
| 5,819,230 | A | 10/1998 | Christie et al. |
| 5,950,175 | A | 9/1999 | Austin |
| 5,983,206 | A | 11/1999 | Oppenheimer |
| 6,078,901 | A | 6/2000 | Ching |
| 6,167,384 | A | 12/2000 | Graff |
| 6,185,683 | B1 | 2/2001 | Ginter et al. |
| 6,192,347 | B1 | 2/2001 | Graff |
| 7,346,567 | B2 | 3/2008 | Weeks |
| 7,395,233 | B2 | 7/2008 | Weeks |
| 7,516,099 | B2 * | 4/2009 | Schneider ...................... 705/38 |
| 2002/0013750 | A1 | 1/2002 | Roberts et al. |
| 2002/0091623 | A1 | 7/2002 | Daniels |
| 2004/0158515 | A1 | 8/2004 | Schoen |
| 2004/0177029 | A1 | 9/2004 | Hammour et al. |
| 2004/0205020 | A1 | 10/2004 | Halawi |
| 2006/0136231 | A1 | 6/2006 | Thomas |

OTHER PUBLICATIONS

Harney, *Shared Equity Financing: Boon to First-Time Buyers*, Jul. 13, 1991, Washington Post.
*The Property Appraisal Helps Determine Your Loan Amount*, Jan. 8, 2002, Yahoo, Inc., printed through www.archive.org., archived date of article is in the URL in YYYYMMDD format.
Usmani, *Principles of Sharjah Governing Islamic Investment Funds*, Apr. 25, 2002.
Lum, *California Lawmaker Proposed Stiffening Penalties for Defrauding Elders*, Mar. 4, 2003, Knight Ridder Tribune Business News.
Kistner, *SEFAs Can Help Parents Buy Houses for Their Children—Shared Equity Financing Agreement*, Dec. 1993, Healthcare Financial Management Association.

* cited by examiner

*Primary Examiner* — Thomas M Hammond, III
(74) *Attorney, Agent, or Firm* — Knobbe, Martens, Olson & Bear, LLP

(57) ABSTRACT

A system and method for conducting a home equity sales (HES) program enables a real estate property owner to sell a partial equity ownership interest in a real estate property. This allows the property owner to sell the interest outright to an investor and receive compensation for the sale of the interest. The property interests of the property owner and the investor are both recorded in property records relating to that particular property. The property owner may sell multiple interests in the same property and an investor may also purchase these multiple interests.

25 Claims, 14 Drawing Sheets

PARTIAL PRESENT INTEREST

HOMEOWNER — (1) ASSET (2) AGREEMENT — INVESTOR (HES OR ANOTHER)

HOMEOWNER RIGHTS
- RETAIN FULL CONTROL OF PROPERTY
- CONTROL CONDITIONS OF FUTURE SALE OR NO SALE
- RIGHT TO REPURCHASE TRANSFERRED EQUITY
- RECEIVE FEDERAL TAX DEFERRAL FROM INTEREST TRANSFER

HOMEOWNER OBLIGATIONS
- PROPERTY TAXES
- MORTGAGE PAYMENTS AND OTHER DEBT PAYMENTS
- REPAIRS
- INSURANCE
- OPERATING EXPENSES/COSTS
- APPRAISAL
- TITLE RECORDATION FEE
- COMMISSION (e.g., 3%)

INVESTOR RIGHTS
- RECEIVE PROCEEDS FROM SALE (IF THE SALE OCCURS) BASED ON TRANSFERRED INTEREST
- OPTIONAL RIGHT TO APPROVE SALE PRICE
- RESELL INTEREST TO OTHER INVESTORS

INVESTOR OBLIGATIONS
- WAIVE CONTROL AND SALE OF PROPERTY
- WAIVE TAX DEDUCTION AND OTHER TAX BENEFITS

| ACCOUNT NO. | PPI MARKET CENTER | | |
|---|---|---|---|
| PASSWORD | | | |
| RECENT TRADES | QUANTITY/PROPERTIES | | SALE PRICE |
| SANTA BARBARA FUND | 10 | | $645,000 |
| SOUTHFIELD FUND | 1,500 | | $2,250,000 |
| ...... | ...... | | ...... |
| PPI FUNDS AVAILABLE FOR SALE: | | | ASK |
| FAIRFAX COUNTY FUND - 3,000 PROPERTIES | | | $4,000,000 |
| ...... | | | ...... |
| PPI FUNDS SOUGHT FOR SALE: | | | OFFER |
| PANAMA CITY | | | |
| SAN BERNADINO | | | |

*FIG. 13*

METHOD FOR MANAGING A HOME EQUITY SALES PROGRAM

CROSS-REFERENCE TO RELATED APPLICATIONS

This application is related to co-pending U.S. patent application Ser. No. 10/714,924, filed on Nov. 18, 2003 and entitled "METHOD FOR CONDUCTING A HOME EQUITY SALES PROGRAM", to co-pending U.S. patent application Ser. No. 10/714,923, filed on Nov. 18, 2003 and entitled "SYSTEM FOR CONDUCTING A HOME EQUITY SALES PROGRAM", and to co-pending U.S. patent application Ser. No. 10/714,922, filed on Nov. 18, 2003 and entitled "SYSTEM AND METHOD FOR CREATING, SELLING AND/OR MANAGING PROPERTY FUNDS IN AN INVESTMENT MARKET". The contents of these applications are incorporated by reference herein.

BACKGROUND OF THE INVENTION

1. Field of the Invention

This invention generally relates to conducting business transactions, and more particularly to providing a business model at least partially based on creating and managing investments in real property. The invention also relates to the formation of a market which allows investors to trade property-based investments in a public or private setting.

2. Background of the Related Art

The option of obtaining money based on equity in real estate is well known. This option is often taken by homeowners looking for ways to finance college tuition, make home improvements, or satisfy other needs or interests. The traditional way of obtaining money from equity in property involves applying for a loan, paying processing fees, and making payments with interest to the lienholder for the life of the loan. Obtaining loans, or other forms of debt, can have a beneficial effect in terms of establishing a favorable credit report. By the same token, incurring additional debt can prove to be burdensome, especially when interest rates are high.

Presently, homeowners and holders of other types of real property cannot extract funds from equity without incurring debt or selling their home or moving to another house. Therefore, it would be advantageous to provide property owners with an option that would allow them to obtain money based on the equity in their properties without incurring debt, and that would preferably allow them to continue to live in or otherwise use/occupy their properties with the same or similar degree of control as previously existed and with the same or similar degree of tax benefits. It would also be advantageous to provide investors with a new kind of investment that is based on partial interests in real property that could be separately held or bundled with other partial interests and which could then be traded, for example, in a public or private market.

SUMMARY OF THE INVENTION

An object of the invention is to solve one or more of the aforementioned problems and/or disadvantages and to provide at least one of the advantages described hereinafter.

Another object of the present invention is to provide property owners with an option that would allow them to obtain money based on the equity in their properties without incurring debt.

Another object of the present invention is to provide property owners with the aforementioned option and simultaneously allow them to live in or otherwise use/occupy their properties with the same or similar degree of control as previously existed and with the same or similar degree of tax benefits.

Another object of the present invention is to achieve the aforementioned objects by providing a new form of business transaction that will allow homeowners to sell partial ownership interests in their residential properties to investors, take the cash from the sale, and use the cash in any way desired, all without the incursion of debt. More specifically, and in accordance with one embodiment, the transaction may be structured in such a way that no interest payments are due, and in a way that will allow the owner and/or occupant to continue living in and using the house is any way desired. As a condition to the transaction, the investor may be required to waive rights to control and sale of the property. Exceptions include the right to receive proceeds from the same and, optionally, a right to approve of a sale price.

The transaction may also be conditioned on the investor waiving additional rights, including the right to take a Federal income tax deduction on the partial interest in property obtained from a sale. Other tax rights to which the investor may otherwise be entitled under the law may also be waived.

The transaction may also be conditioned upon an agreement where neither the investor nor any other party has a right to interfere with the original owner's living conditions or preferences. The transaction is also beneficial from a financial standpoint. For example, under recently issued IRS regulations, a homeowner may defer paying Federal income tax on gain from the sale.

Another object of the present invention is to provide an investment market somewhat equivalent to a stock market, except that instead of trading stocks bundles of partial residential property-based rights are traded, transferred, or otherwise exchanged between or among investors. The property in each bundle may be located in a same geographic area including but not limited to a same zip code, census tract, community, city, county, or state. Alternatively, the property in each bundle may be a same type of property categorized by one or more of a variety of factors including price, capacity (e.g., townhouse, condominium, single-family home, or types of single-family homes), amenities (beachfront, lake front, etc.), HUD housing, as well as others.

Another object of the present invention is to provide an investment market where the value associated with one or more partial interests in property is transferred by virtue of selling stock in a holding company, which retains tide to the partial property interests and whose stock is at least partially capitalized based on the value of these interests.

In accordance with one embodiment, the present invention provides a method for performing a business transaction, comprising receiving a partial present interest in real property from a first party and transferring consideration from a second party to the first party for the partial present interest. The real property is preferably a primary residence of the first party and the consideration includes at least one asset and a written agreement by the second party to waive rights to control and sale of the real property. The partial present interest is preferably a minority interest in a house, townhouse, condominium, cooperative, or any other type of residence.

In the transaction, the asset transferred by the second party may be an amount of money, a financial instrument such as stocks or bonds, satisfaction of a debt, or any other item of worth. The amount of money may be computed as a percentage of a currently appraised value of the real property or a percentage of net equity the first party owns in the real property.

Under the written agreement, the second party agrees to retain or waive a variety of rights. For example, the second party may retain a right to receive proceeds from a sale of the real property and a right to approve its sale. The first party may also be subject to a number of conditions including payment of taxes, insurance, debt payments, costs, and expenses. Transfer of consideration may likewise be subject to a number of conditions including requiring the first party to have a minimum net equity in the real property or requiring the first party to pay all costs associated with the transfer. The first party may also have an unrestricted right to reacquire all or a portion of the partial present interest transferred to the second party. This reacquisition is preferably based on a current appraisal of the real property. The transaction may also be structured so that the first party retains tax benefits equal to full ownership of the real property. These benefits include a deferral of federal income tax realized by sale of the property, mortgage interest deduction, property tax deduction as well as others.

The second party may be an individual, institutional investor, or another type of investor, or an entity of which any or all of the foregoing have ownership or other rights in the property. This investor may either retain the interest conveyed in the transaction or transfer that interest to another party in whole or part. In the latter case, in one embodiment, the investor acts as an intermediary who acquires one or more interests in residential property with the hope of reselling those interests at a profit to subsequent investors. The intermediary may also perform a number of administrative functions, or alternatively exchange of funds may take place directly between buyer (or other entity of the buyer) and seller with the intermediary performing only administrative functions.

In another embodiment, the present invention provides a system for managing a transaction which involves the transfer of a partial equity interest in residential property. This system includes a data handler for inputting and outputting real estate property transaction related information, a data storage unit which stores information arising from the real estate property transaction and documents all pertinent information relating to the transaction, and a processing system which processes the real estate transaction related information including application information, performs documentation checking, and allows for the extraction and transfer of funds.

In another embodiment, a method for managing a partial equity interest transfer in real property includes applying for a real estate property equity sale and providing information relating to the real estate property transaction, enabling a contact and data interface between a real estate owner owning a property interest and a home equity sales (HES) entity, and entering data relating to a real estate property transaction. Additional steps include storing information arising from or related to the real estate property transaction, checking for related property documentation that provides an input into the application process, and ensuring that all pertinent property documentation is provided.

A processing step includes processing all pertinent information relating to the transaction. A funds exchange between all the parties participating in the real estate property transaction is then performed and all monetary obligations associated with and incurred during the transaction are satisfied. Documents related to the real estate transaction are then executed and/or filed and/or recorded.

In another embodiment, a method for selling a partial partnership interest in a real estate property includes creating a database including contact and data interface between a real estate owner owning a property interest and a home equity sales (HES) entity and entering data relating to a real estate property transaction. Information arising from the real estate property transaction is stored in a storage medium. An application for a home equity sale may then be made and information relating to the real estate property transaction may be input into the database. This information includes ownership information, appraised value of the property, a specific amount of partial interest intended to be sold and listing of all parties involved in the transaction.

A plurality of transaction parameters are ascertained and a determination is made to see if the real estate transaction is worth performing. There is also a checking for related property documentation that has been input into the database and provides an input into the application process and ensures that all pertinent property documentation is provided and wherein the checking function also checks for completeness or incompleteness of the application and determines if the transaction should proceed or not proceed and ensuring that all transactions conform and comply with all laws governing the transaction including federal, state and local laws. All pertinent transaction information relating to the transaction is processed in a programmable processor. The method determines an approval, a disapproval or a qualified approval of a submitted application in the programmable processor.

Funds are transferred between all interested parties participating in the real estate property transaction and satisfying all monetary obligations associated with and incurred during the transaction, and documents are executed and/or filed that are related to the real estate transaction and making all the documents of record related to the transaction of record in the database.

BRIEF DESCRIPTION OF THE DRAWINGS

FIG. 13 is a diagram showing an interactive website which may be used to provide information related to the investment market of the present invention.

DETAILED DESCRIPTION OF PREFERRED EMBODIMENTS

An HES program in accordance with the present invention offers a choice to persons having an equity interest in real property. One advantage of the HES program is its ability to bridge different communities (e.g., homeowners, investors, etc.) and thereby bring substantial benefits and improved synergy to participants from these communities. The HES program further provides property owners with immediate access to capital that would otherwise not be available to them for many years, except in the form of a debt obligation.

The description that follows will discuss the various embodiments in relation to a residential homeowner and residential property and the extraction of equity from the sale of partial partnership interest in the property. However, those skilled in the art will realize that an HES program may also be applied and implemented to other forms of property including, for example, vacation property, commercial property, a combination of residential and commercial properties, without departing from the spirit and scope of the present invention.

The capital obtained from the sale of the equity could allow a homeowner to add a large addition to the house, retire high interest consumer debt, or even finance their existing mortgage package at the best rate available due to improvements in their consumer debt profile. The same homeowner is also free to use this same capital to meet other needs, such as paying for college tuition, cash leveraged major purchases (e.g. cars, boats, vacations, land, etc.), home improvements. The freed up capital could also be used to invest in other potentially rewarding investment opportunities. In other words, there are no limits or constraints on a homeowner regarding the use of the funds.

The investor who purchases this partial or minority interest, also receives substantial benefits under this same program, whether they are a private investor or a large institutional investor or fund. Through the HES program, these investors are able to purchase a direct equity ownership in desirable properties that have a high expectation of capital appreciation, thereby offering the opportunity to increase their expected return.

These real-estate, property-based investments would also have a high level of safety and security when compared to equity surrogates for capital appreciation such as common stocks or mutual funds of common stocks. Historically, owner-occupied residential real estate has been one of the most stable and non-volatile forms of investment. In addition, the HES program operator would have knowledge of local markets to provide investors with the comfort that the properties are being offered for sale in desirable areas.

Figure 1:
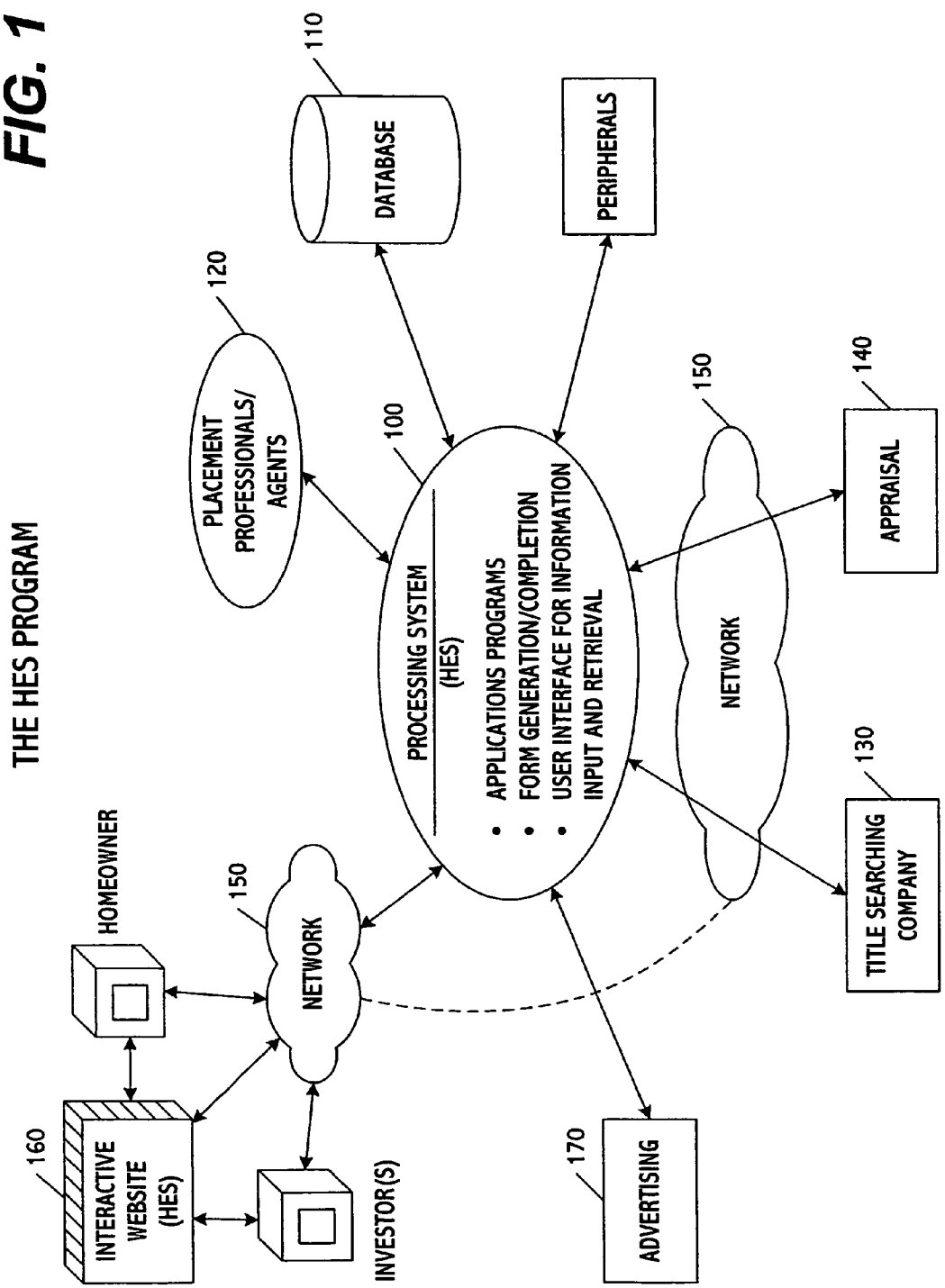
FIG. 1 is a diagram showing an exemplary system for selling a partial equity interest in real property in accordance with one embodiment of the present invention.

FIG. 1 shows a preferred embodiment of a system for managing the transfer of a partial equity interest in real property according to the present invention. As will be discussed in greater detail, the transfer between homeowner and investor takes place through a facilitating party responsible for administrating the HES program. The duties and fees to be collected by the facilitating party vary depending on the circumstances (e.g., type of property, geographical location, preferences of the parties, etc.). The property subject to transfer is preferably residential property such as a single-family house, townhouse, condominium, or cooperative. This property may be owner occupied (e.g., the owner's primary residence) or may be empty or occupied by another (e.g., a secondary home, vacation home, held as investment property, etc.).

The system is preferably formed from an integrated collection of resources including a processing system 100 and a database 110. The processing system is managed by placement professionals/agents 120 and runs application programs for implementing one or more steps of the methods described herein. By way of example, the programs may allow agents to enter information pertinent to the property interest transfer including personal, financial, and legal information relating to the property and/or the property owner. This information may then be archived in the database for subsequent reference and modification. If desired, a database search function may be included in order to match homeowners and investors based on designated search criteria. The programs also preferably include software for computing property transfer and transaction costs owed by one or more of the parties, generating forms for reporting title and appraisal information, and collecting insurance, solvency, equity information relating to the parties and the property subject to transfer. Additional administrative functions may also be performed.

For improved efficiency, the processing system is preferably linked to the title searching company 130 and the appraiser 140 through a network 150, however more traditional forms of communication may be used if desired. In order to link homeowners and investors, the processing system may include or be linked to an Internet server 160 for generating an interactive website for providing general information about the HES program, answering anticipated questions, and providing on-line forms including, for example, pre-approval applications. In addition to the website, various other forms of advertising 170 may be used to attract homeowners and investors to the HES program.

To perform the foregoing functions, the processing system may therefore include a data handler for inputting and outputting real estate property transaction related information. The data handler also handles information relating to the owners of the property, the location and address of the property, and any third parties that intend to obtain an interest in the property. The data handler includes one or more data input devices that enable a contact and data interface between a real estate owner owning a property interest and a HES entity and also provides for the entering and handling data relating to a real-estate property transaction.

As previously discussed, the database stores information arising from the real estate property transaction. For example, the information may include the appraised value of the property, any lien or title information related to the property, the amount of equity that the homeowner wishes to sell, and the names of the parties that are involved in the transaction.

The processing system processes the real estate property transaction related information, provides an information base for the extraction of funds from equity in the property, and performs computation and archival functions relating to the transfer (e.g., sale) of the partial equity interest in property. The partial equity interest is preferably a present interest, in which case the transfer creates a concurrent estate formed from partial interests held by the homeowner and investor. These partial interests are listed on a new deed or other ownership alternative generated by the placement professional, the transfer of which may be subject to one or more conditions (e.g., sale-price approval) to be discussed in greater detail below.

An objective of the HES program is to bring together both qualified homeowners seeking to exchange a portion of the equity in their homes and members of the investment world seeking a safe investment vehicle with historically strong returns. The HES program reaches out to both worlds and develops market approaches on both the consumer and investor level.

Figure 2:
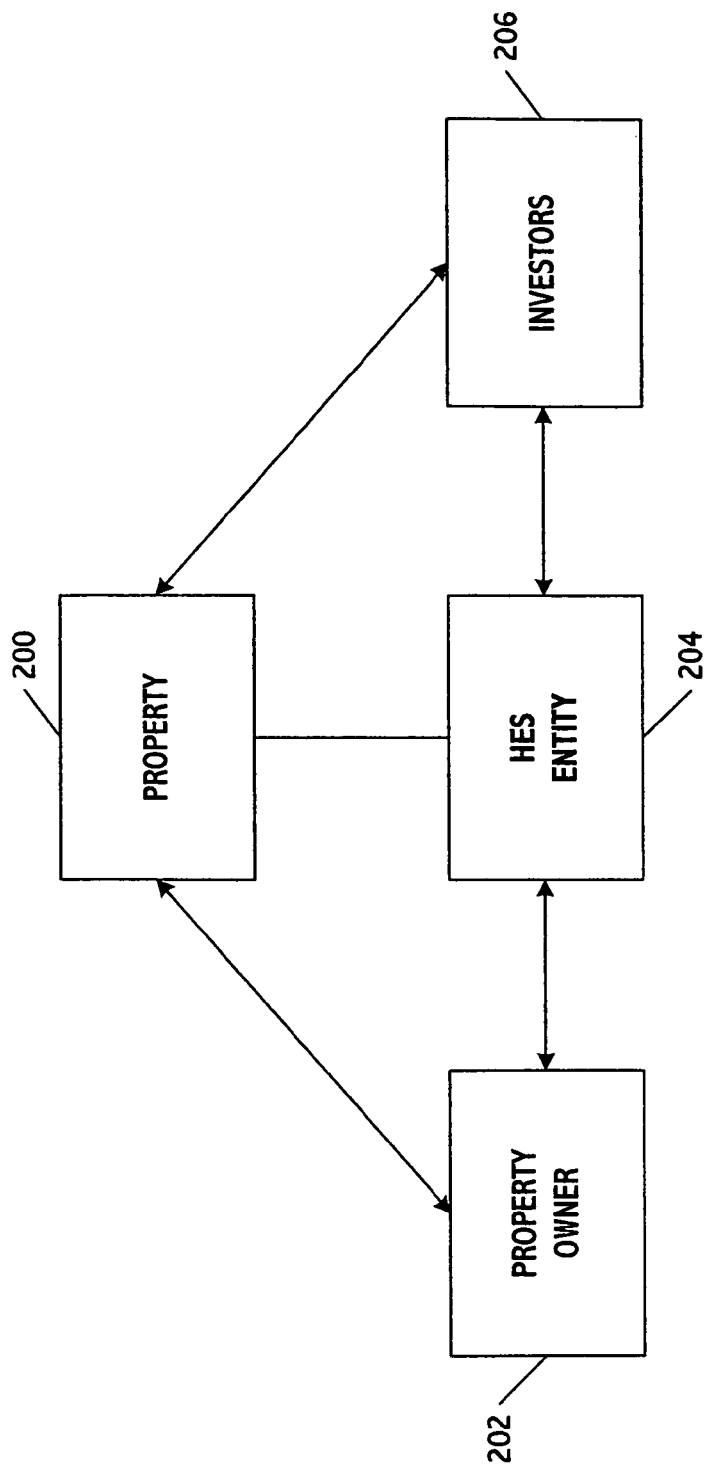
FIG. 2 is a diagram showing one possible interrelationship among parties in a new type of business transaction provided in accordance with the present invention.

FIG. 2 shows a preferred interrelationship between interested parties in an exemplary HES transaction. In this diagram, a specific property 200 exists that is owned by a property owner 202. An HES entity 204 exists whose main function is to accomplish the sale of the equity in the property and also serves as a liaison and clearing house to facilitate the data and monetary exchanges and all other related real estate transactions between the property 200, the property owner and any investors 206 that wish to participate in the real estate property transaction. Those skilled in the art will appreciate that a property owner 202 may sell multiple partial equity interests in the property 200. The HES entity 204 may also represent a plurality of different properties and the investors 206 may invest in the same property multiple times (i.e. buying multiple partial or fractional shares of the overall equity of the property) or they may invest in multiple properties across multiple geographic areas.

It should also be apparent that the investors 206 may own the investment for themselves and their own financial betterment, or they may also offer shares in a mutual fund or other entity that includes a collection of various equity property interests and market these mutual fund or other entity shares to other investors. The properties invested in may all be located in one geographic region or they may be located across various geographic areas and any combinations thereof. Furthermore, the HES entity 204 itself, may provide the fund or other entity investment vehicle to outside investors (who buy shares in the fund or other entity itself and do not themselves directly own the equity interests in the properties) instead of the investors 206 or in some combination with the investors.

As remuneration for arranging, executing and facilitating the real estate transactions, one exemplary compensation scenario has the HES entity 204 receiving a one time commission sale of 3% of the equity sale at the time of the equity sale. The cost of the sales commission is preferably borne by the homeowner, with the investor receiving full credit for the funds that they provide to the transaction. The investor then owns this partial equity interest and the investment continues to appreciate pro rata with the total equity of the property.

Figure 3:
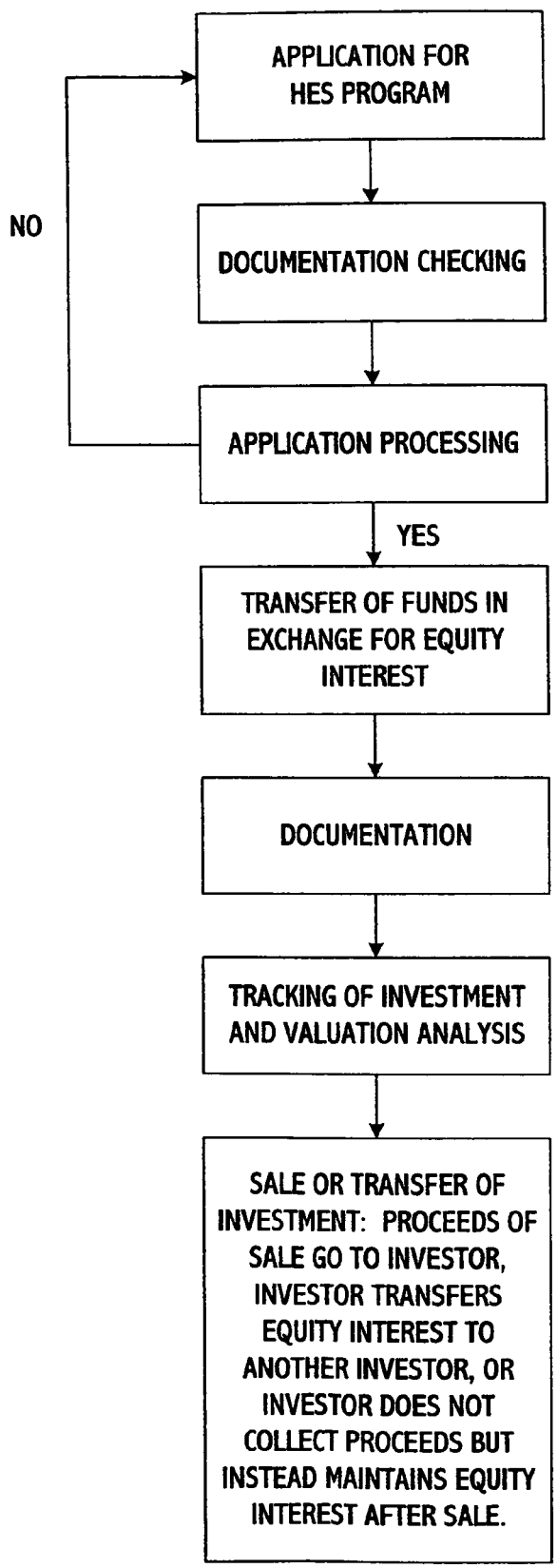
FIG. 3 is a diagram showing steps included in a method for implementing a business transaction in accordance with one embodiment of the present invention.

FIG. 3 is a diagram showing steps included in another embodiment of the method of the present invention for implementing an HES transaction. In this method, a homeowner applies for an HES program 300. This application process may be done electronically, by a Web interface of an Internet site, or by filling out a paper application. Also, the application process can be conducted by homeowners themselves or in conjunction with the assistance of an HES employee that may facilitate the application process.

Next, there is a documentation checking function 302 that examines all of the pertinent documentation that currently affects or may affect the property. This checking function includes examining the appraisal and valuation of the property, the title of the property and any liens against the property. The main goal of the checking function 302 is to determine that from a legal and transactional standpoint that all related documentation is in order and there is no impediment to transferring tide for any of the partial equity interests that are being sold.

In 304 of FIG. 3, the application is processed. In the application processing 304, the application is examined for accuracy and completeness. For example, the names of the interested parties are checked and verified, the amount of equity residing in the property is confirmed, and the partial equity interest to be sold is quantified. Additionally, another check of all the documentation (302) is performed and examined for completeness. If everything is found to be in order in the application processing 304, the method moves on to the subsequent transfer of funds 306. If the application processing 304 finds something that is out of order (e.g. missing, incomplete or inaccurate information), the method returns to the application stage 300 where the application is updated to address the deficiency found in application processing 304 and then processed from there.

In 306 of FIG. 3, there is a transfer of funds between the participating parties in exchange for the partial equity ownership interest that is sold and those services that are rendered in effectuating the transaction. Referring back to previous FIG. 2, the main interested parties are the property owner 202, the HES entity 204 and the investors 206. The purpose of 306 FIG. 3 is to ensure that funds are transferred accurately and promptly between the various parties (202, 204 and 206) involved in the transaction. Also, those skilled in the art will realize that the funds transferred may be transferred electronically or physically (e.g. check, cash). Furthermore, in addition to cash or cash equivalents, the funds may also be in the forms of different financial instruments, including warrants, options and bonds. The system is designed to be flexible and scalable to accommodate and handle the various types of funds and fund equivalents that may arise from the real estate transaction.

In 308 of FIG. 3 in one exemplary instance, all the necessary documentation is generated and recorded where necessary. For example, a new deed to the property is prepared to include both the original homeowner and the owner of the partial equity ownership share. Because the investor is a named owner on the deed (directly or indirectly) through HES, any pending decisions to place the home on the market and any fiduciary correctness of any pending sale are subject to HES or the investor's scrutiny and approval prior to release. As previously indicated, another type of ownership alternative may be used in lieu of a deed for purposes of transferring the acquired equity interest. For example, the equity interest might be a contractual agreement specifying a right, option, or warrant to own that specific economic percentage (e.g., partial interest) of the property.

The documentation includes what percentage of the overall equity has been sold and for what amount. Also, as mentioned previously, the same property can be sold off into a plurality of partial equity ownership shares and all of this information is then documented and made of record where necessary.

The homeowner remains responsible for all or a proportionate share of property taxes, mortgage payments, repairs, improvements, insurance and general operating expenses of the property. Any transaction costs that are associated with a particular property including appraisal fees, title recording fees, and transaction fees (e.g. similar to a partial real estate commission) are paid by or come out of the funds due to the homeowner. The homeowner would also have the option of, at any time, to repurchase the equity from the fund based on the appraised value at the time the repurchase would be proposed.

The HES program also allows a homeowner to have the full use of net proceeds from the HES transaction (after deductible costs and fees) from day one after the closing of the transaction, and have no interest payments, no requirement to pay anything back to anyone and no entry whatsoever on the homeowner's credit report.

The successful launch of any new program is dependent upon a sound marketing strategy and campaign. Homeowners are attracted to this HES program through marketing campaigns (both local and national) that promote the benefits of the program, specifically the simplicity and expediency of entering and completing a transaction. The immediate tax benefits or consequences to the homeowner are also explained in detail as part of the marketing efforts associated with the HES program. Additionally, marketing will emphasize the advantages that the HES program has over the more well known home equity loans or lines of credit.

Private and institutional investors will also be sought through marketing campaigns that explain the benefits of investing in the home real estate market with the focus on the safety of the investment and the potential for capital appreciation through equity ownership in the preferred, more lucrative, single-family home residential markets.

The HES program would also allow investors in slower growth areas (e.g. the Midwest) to own home equity in the more rapidly growing areas of the country (e.g. California) with the knowledge that over time, market forces like retirement migration and controlled growth are likely to continue to drive pricing upward on an increasing demand basis.

An HES program engages the services of several senior level consultants working on a commission or other basis to attract capital from institutional investors. Research has shown that institutional investors will find the HES program very enticing for its own merits, as well as a portfolio rebuilding strategy that could help them recoup losses that were sustained from stock market declines sustained over the past few years. Again, owner-occupied residential real estate has proven itself to be relatively stable and able to provide attractive rates of return over time.

Figure 4:
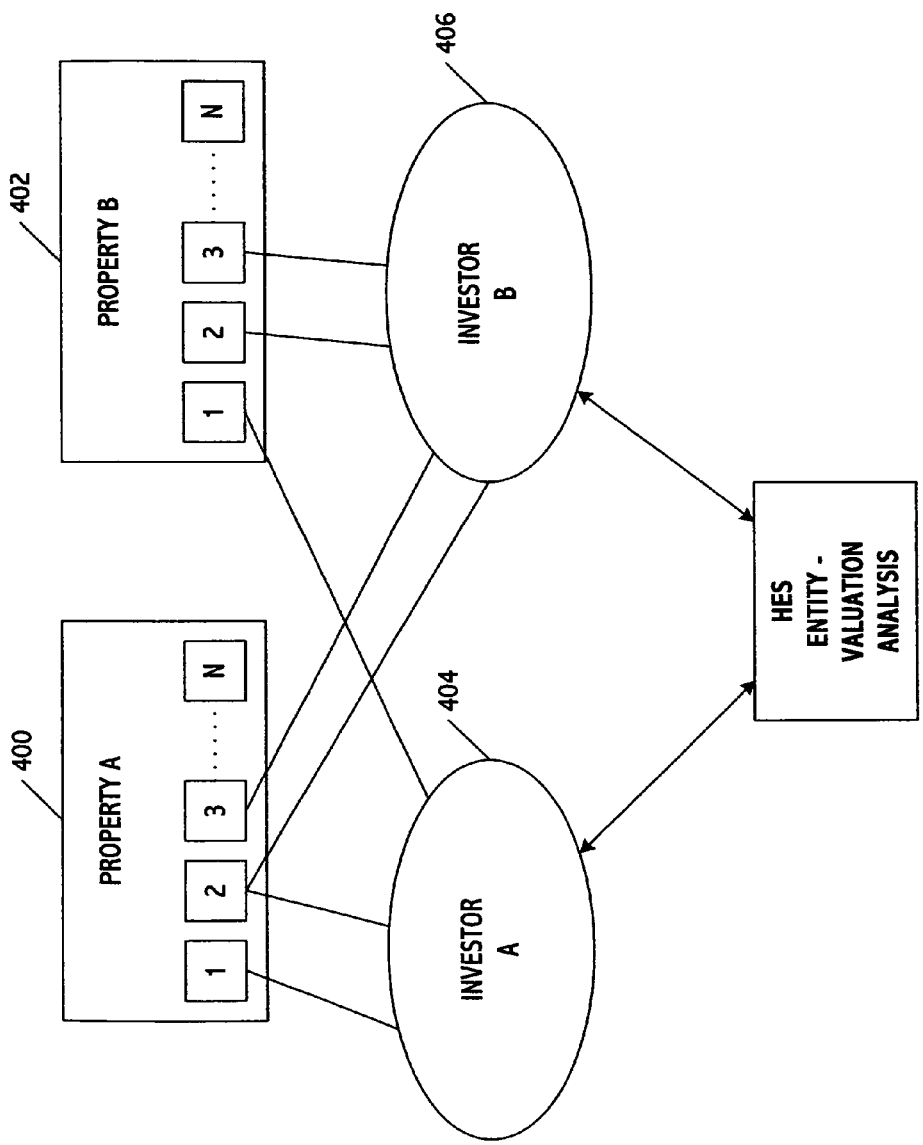
FIG. 4 is a diagram showing one way in which a business transaction in accordance of the present invention may be structured among a plurality of investors, properties, and a facilitator of the transaction illustratively labeled HES Entity.

FIG. 4 illustrates an exemplary diagram of a plurality of investors and properties and an example of the investment relationships that are possible between the investors and the properties. There are two investors 404 and 406 that are interested in participating in an HES program with reference to two properties 400 and 402. The number of participants in the exemplary HES program are for purposes of illustration only and it should be apparent that a greater or lesser number of investors and properties and various combinations thereof may be used without departing from the spirit and scope of the present invention.

Property A 400 is divided into N fractional partial ownership interests (1, 2, 3, ... N) and Property B 402 is also divided into N fractional partial ownership interests (1, 2, 3, ... N). Investor A 404 is shown to own two fractional partial ownership interests in Property A 400 (1 and 2) and one fractional partial ownership interest in Property B 402 (1). Investor B 406 is shown to own two fractional partial ownership interests in Property A 400 (2 and 3) and two fractional partial ownership interests in Property B 402 (2 and 3).

Figure 5:
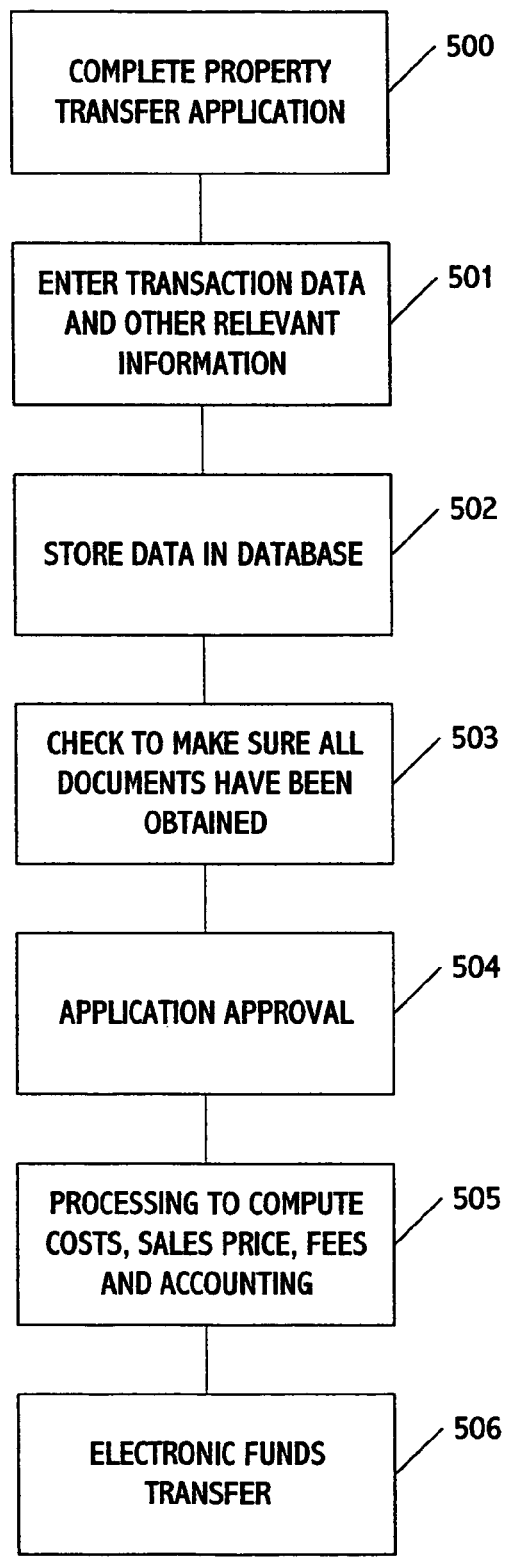
FIG. 5 is a diagram showing steps included in a method for managing the sale of a partial interest in real property in accordance with one embodiment of the present invention.

FIG. 5 is a diagram showing steps included in another embodiment of the method of the present invention for transferring a partial equity interest in an owner-occupied residential real estate property. This method includes allowing prospective HES program participants to apply for a real estate property equity sale and providing information that relates to the real estate property transaction. (Block 500). This step includes permitting direct and indirect participation in the real estate transaction. In other words, an applicant may enter application data directly into the system (e.g. via a web interface). Alternatively, an applicant may work with an HES customer service representative, who then enters the data indirectly for the applicant.

Next, contact and data interface is enabled between a real estate owner owning a property interest and an HES entity. (Block 501). This interface allows entry and manipulation of data relating to the real estate property transaction. This data includes, for example, ownership information, appraised value of the property, the specific amount or value of the partial equity interest to be sold, and a listing of all the parties involved in the transaction.

The entered information is preferably stored in the database (Block 502), and a check is performed to ensure that all property documentation and other information required for the application process has been obtained (Block 503). A check may also be performed to confirm completeness or incompleteness of the application and to support the ultimate determination of whether the transaction should proceed or not proceed, i.e., whether the application should be approved. (Block 504). An additional check may also be performed to determine if additional information is required or if information needs to be corrected before a final approval on the transaction is granted.

One or more processing steps are then performed, during which the entered information is preferably organized and used as a basis for computing commissions, costs, and importantly the price the investor will pay for the partial property interest as well as the technical form of the equity interest shall take (e.g., deed, option, warrant, right, etc.). (Block 505). The processing also provides a final disposition of a submitted application and ensures that any fees or any compensation due to any of the participating parties is identified and paid out. Additionally, processing steps may also be performed to process a standard type of home equity loan or line of credit. Those skilled in the art can appreciate that one or more of the computation steps described above may be performed by a placement professional if desired.

An optional funds exchange step may be performed to transfer funds between all the parties participating in the real estate property transaction and satisfy all monetary obligations associated with and incurred during the transaction. (Block 506). This may include transferring funds in all directions between the various interested parties and will handle cash, checks and all other types of cash equivalents. The exchange may also handle warrants, options, financial instruments, financial derivatives and debt instruments.

All documents generated by the property interest transfer are filed/recorded as required by law. This includes a new deed or other ownership alternative reflecting the ownership of the transferred property by all parties involved. Another ownership alternative may include an interest conveyed by contract, which interest would then be recorded, for example, as a lien in connection with the property. This alternative interest transfer may be beneficial for purposes relating to local ordinances or business issues from executing a new deed to the property, such as a property tax reassessment or the trigger of a due-on-sale clause, or for other reasons.

Figure 6:
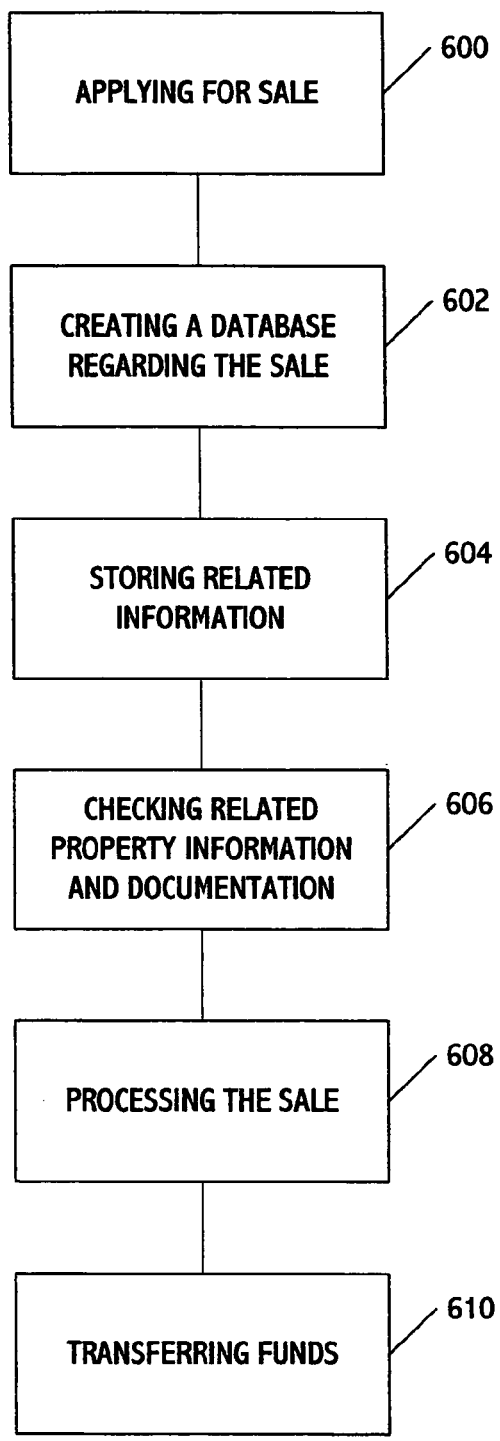
FIG. 6 is a diagram showing steps included in a method for selling a partial interest in real property in accordance with one embodiment of the present invention.

In another exemplary embodiment of the present invention, a method for managing the transfer of a partial equity interest in an owner-occupied residential real estate property is shown in FIG. 6. FIG. 6 includes applying for the sale 600 of the equity interest in the property. A database is created 602 that includes contact and data interface information between a real estate owner owning a property interest and a HES entity. Also, data is entered relating to the real estate property transaction.

The HES transaction information is stored 604 as well as the database that was created in 602. All of the transaction information is also checked in 606. For example, 606 checks for completeness or incompleteness of the application and in conjunction with processing the sale 608, determines if the transaction should proceed or not proceed.

After processing the sale 608, funds are transferred 610 between the parties. For example, an equity interest is sold to an investor in exchange for money or other value that is conferred upon the property owner. The equity interest is filed/recorded on the deed or other ownership interest and shows that the investor is now in possession of an equity interest in the property along with the property owner of record.

Figure 7:
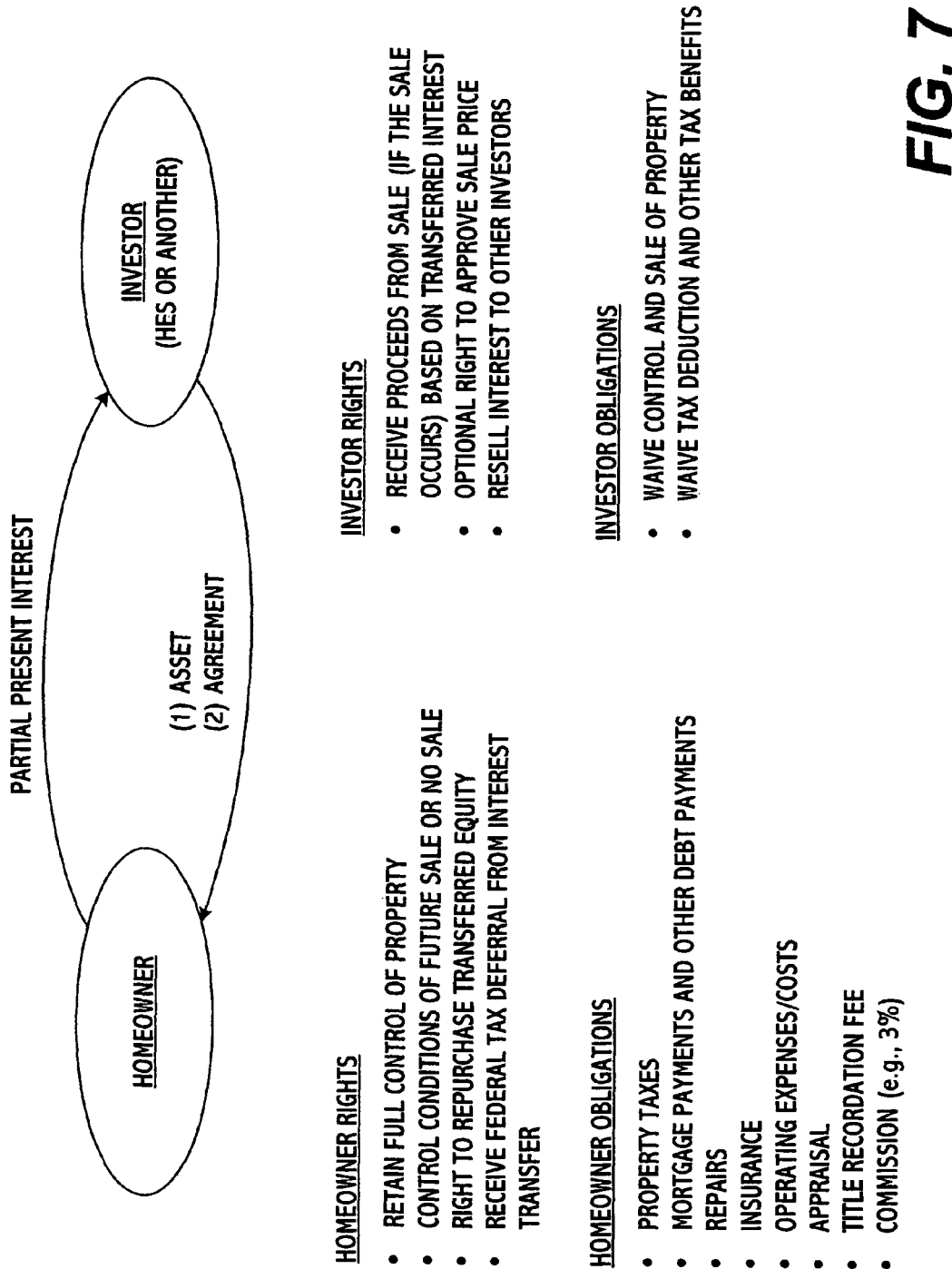
FIG. 7 is a diagram showing another way in which a property interest transaction may, be structured between a homeowner and investor in accordance with the present invention.

FIGS. 7-10 show various ways in which a transaction may be structured in accordance with the present invention. In FIG. 7, only two parties are involved, namely the homeowner and an investor who may be an individual or other entity. The investor may also be the intermediary HES, who in this case may take ownership of the partial interest in real property and either hold that interest or sell or transfer that interest at a later time to a third party. If HES holds this interest, it may do so by transferring the interest to a REIT, a holding company, or other business entity or fund.

The transaction in FIG. 7 is structured so that the investor transfers an asset to the homeowner in return for a partial present interest in property. The asset may be a sum of money as previously discussed (e.g., the lesser of 20% of the currently appraised value or 50% of the owner's equity) or some other form of consideration. The investor also preferably executes a written waiver of rights to control and sale of the property. The transaction may therefore leave the homeowner with one or more of the following rights: right to full control of the property, right to determine whether the property is ever sold and if sold the conditions of the sale, right to repurchase transferred equity in the property, and a right to defer federal income tax related to the interest transfer (this is dictated by prevailing IRS regulations).

The homeowner may be left with the following obligations (and all or a portion of each): duty to pay property taxes, insurance, mortgage and other debt payments, duty to make repairs and improvements, and duty to pay operating expenses. In the event the homeowner makes improvements (e.g., adds a deck or room, finishes a basement, etc.), the homeowner may be required to sign an agreement to allow the investor to reap a pro rata portion of the increase in property value/sales price of the house obtained by those improvements, even though the investor did not pay for any portion of the improvements. For example, if adding a new room resulted in a $50,000 increase in the sales price of the property, the investor would receive a pro rata portion of the $50,000 increase (e.g., 20% of the sales price or 50% of the homeowner's equity, whichever is less) even though he paid no portion of cost for building the new room. The homeowner may also be obligated to pay transaction costs including a commission fee to HES, title recordation fee, appraisal fee, etc.

The investor rights include a right to receive proceeds from a subsequent sale of the property (if the sale should ever occur) based on the transferred interest, and an optional right to approve of the sale price. The investor obligations include executing an agreement to waive rights to control and sale of the property. This agreement preferably runs with the land as to all subsequent bona fide transferees.

Figure 8:
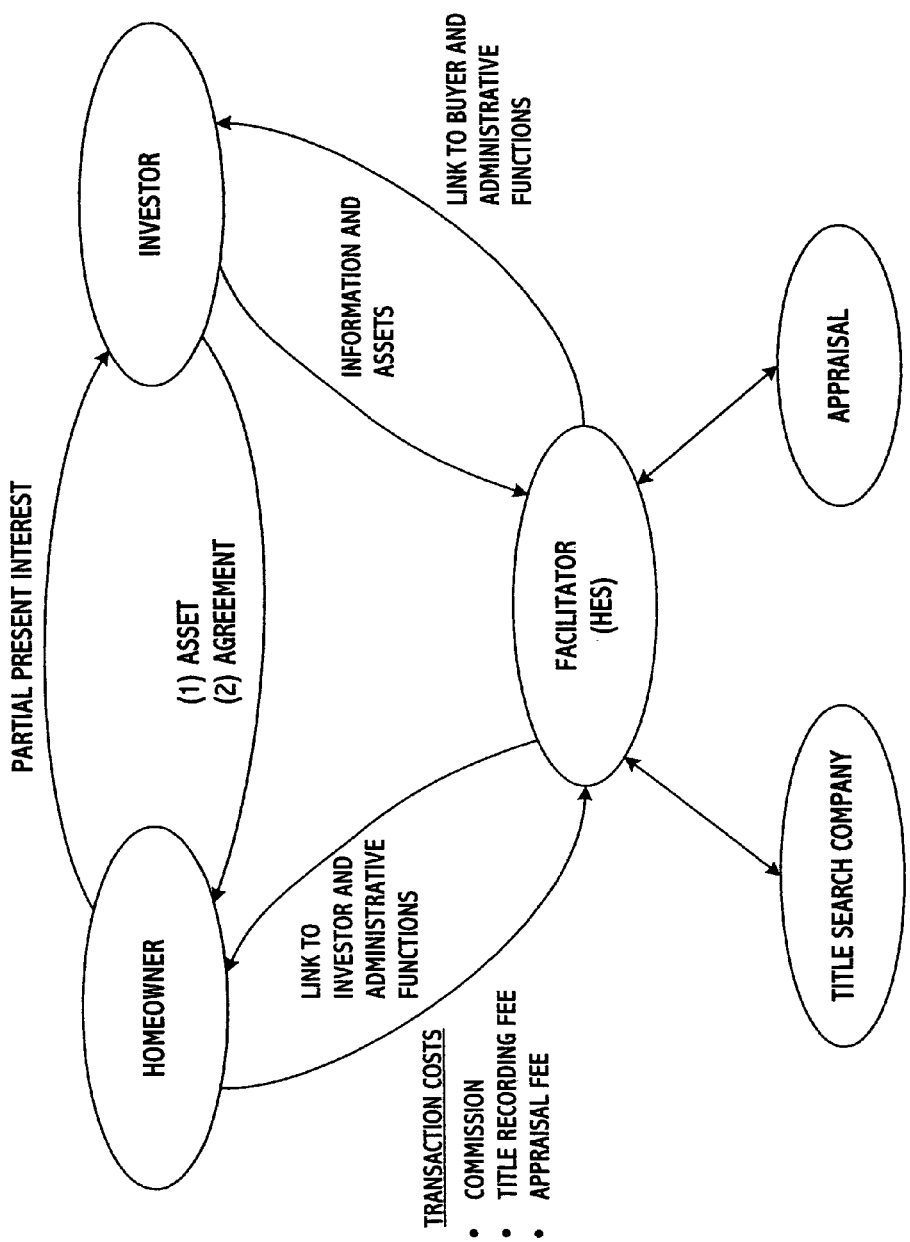
FIG. 8 is a diagram showing another way in which a property interest transaction may be structured among a homeowner, investor, and a facilitator in accordance with the present invention.

FIG. 8 shows another way in which a property transaction may be structured in accordance with the present invention. The transaction involves three parties: the homeowner, an investor, and HES which acts as intermediary between the two. Unlike FIG. 7, HES never owns the partial property interest being transferred. Rather, HES acts as a facilitator, first, to link the owner and investor and, second, to perform a variety of administrative functions to facilitate the transaction. The homeowner is left to pay transaction costs to the facilitator, which costs may include a commission fee based on a currently appraised value of the property, a title recording fee, and an appraisal fee. For higher priced properties, these costs may be substantial, thereby allowing HES to reap significant profit from the transaction.

Figure 9:
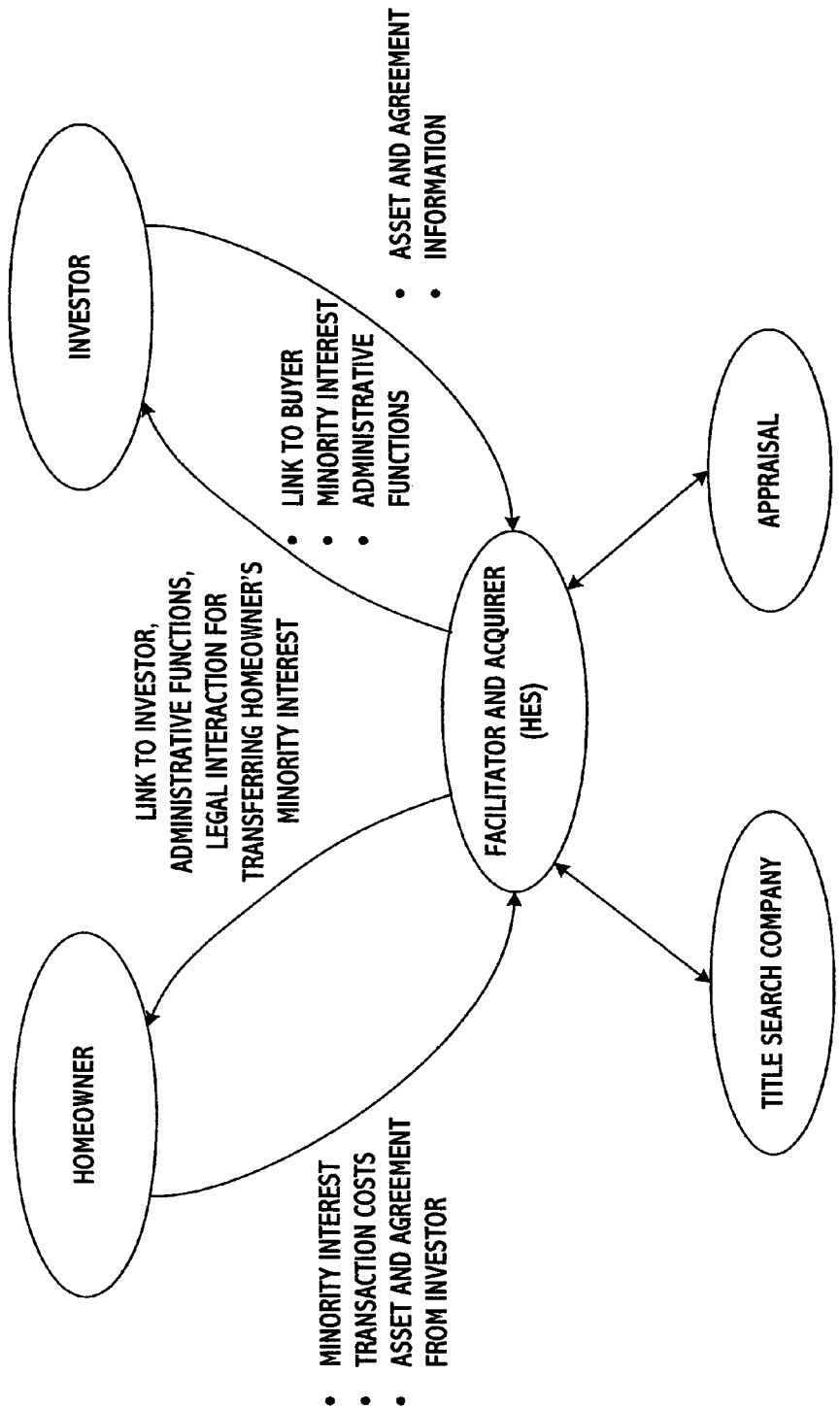
FIG. 9 is a diagram showing another way in which a property interest transaction may be structured among a homeowner, investor, and a facilitator in accordance with the present invention.

FIG. 9 shows another way in which a property transaction may be structured in accordance with the present invention. This transaction also involves three parties, however unlike FIG. 8 the facilitating party purchases the property interest from the homeowner for later transfer to the investor. The interest may be a minority interest, however any partial interest in the property may be transferred if desired.

Figure 10:
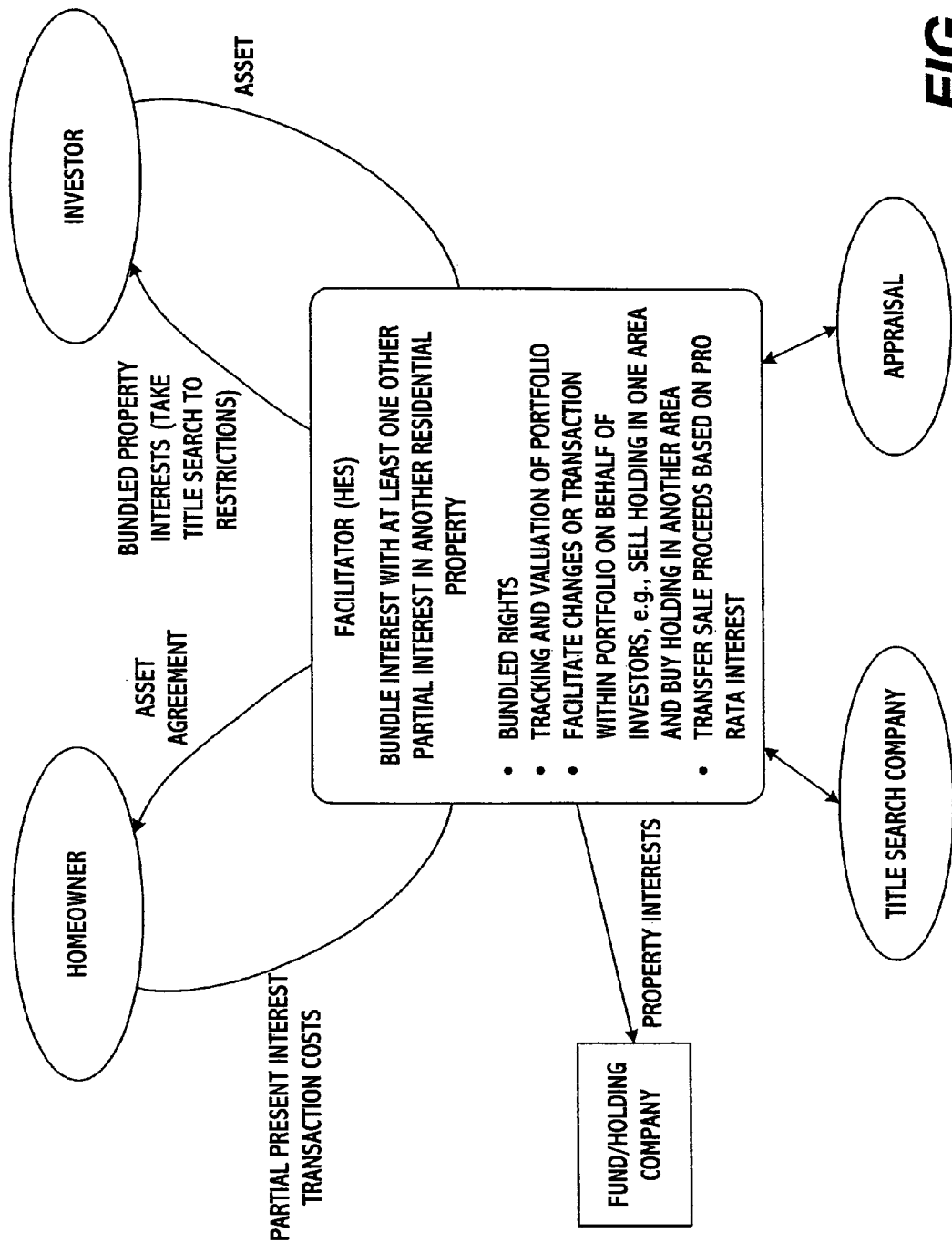
FIG. 10 is a diagram showing another way in which a property interest transaction may be structured among a homeowner, investor, and a facilitator in accordance with the present invention.

FIG. 10 shows another way in which a property transaction may be structured in accordance with the present invention. This transaction includes the same three parties as previously discussed. However, unlike the previous transactions the facilitator (HES) bundles the property interest received from the homeowner with one or more partial interests in other properties, which, for example, may be located in the same geographical area (e.g., same community, county, or state). This bundling embodiment of the present invention is especially attractive to investors when all properties are located in an area where property values are anticipated to rapidly increase in the near future. Areas of this type include ones where the demand for housing is expected to grow precipitously because of an influx of population, business, capital, or other resources.

Although not shown, an institutional investor such as a mutual fund or Real Estate Investment Trust (REIT), may also participate in the HES program and own multiple ownership shares in a plurality of investment properties. Any of the operating and investment principles that are well known in the financial community (financial partnerships or groups, such as mutual funds) may be applied to the HES program. A mutual fund may be formed completely by assets that are derived from an HES program or the funds may be hybrids that invest in different combinations of assets, including HES program assets as a portion of their asset allocation mix.

Another group of institutional investors that should find the HES program interesting is pension funds. An HES program will be very appealing to these fund managers, because data shows that historically, since 1960, appreciation rates of owner-occupied residential real estate has outperformed the Stock Market's average annual returns, while at the same time having dramatically lower volatility. Upon obtaining a complete understanding of how the HES program operates, it is expected that the demand amongst the institutional investment community to participate in available HES program portfolios will accelerate dramatically.

HES provides its local knowledge in the market to assure that the investors in the HES fund receive full value for their ownership, should the homeowner put the house up for sale. While HES will not interfere with the homeowner's plan to sell, the requirement to sign off on the deed or other ownership alternative will assure the investor that the homeowner is indeed attempting to obtain the highest possible sale price for the property. This would ensure that the investment of any HES program participant is protected from a "fire sale" or some other sale at less than fair market value for the property.

An important aspect of HES program operation is a successful marriage between the specific needs, desires and expectations of homeowners and investors and what outcomes they desire from the various investment opportunities. Homeowners would be solicited in a specific geographic area through a number of channels, including newspaper advertisements and spots on local radio and television stations. For example, one marketing campaign would use "Local Insert" television advertising that is inserted on the local level to cable and satellite TV subscribers and run as commercials during breaks in CNN or Financial News, targeting more sophisticated home ownership in the area.

These aforementioned types of solicitations would inform the homeowner of some of the highlights of the program for their benefit and direct them to a Website or toll-free phone lines for more information. Additionally, local seminars may be held to generate interest, explain the program and create a sense of immediacy about participating in the program. Upon attending one of these seminars, there would be an opportunity to learn what funds and investments might be available to them and apply to the program if they desire. The completion of a full application would give them a more specific evaluation as to what the equity in their home would be and what kind of capital could be available to them through an HES program. These types of "Jump-Start Programs" would be aggressively utilized in the early days of approaching a new locality.

Based on the successes of some of the newer marketing models for home re-financing markets, HES anticipates that the Internet will play a significant role in not only how homeowners learn about the program, but in some of the hands-on factors of qualifying themselves, answering their own questions and filling out applications over the Internet.

It is anticipated that many homeowners will want to avail themselves of more services from HES. For example, they may request the services of an HES representative by telephone and ask for help and assistance in the various stages of making an application, on through the signing of final documents and receiving payment for their sale of equity to investors.

HES will hire and train "Placement Specialists" to work directly with these enquiring homeowners to assist them with the entire process. These Placement Specialists will be experienced at qualifying the applicants, as well as becoming knowledgeable about the specific property, its neighborhood and current comparable trends in the same market. It is for these reasons that current real estate professionals will play supporting roles in the rollout and execution of HES programs, because of their specialized knowledge and experience in dealing with real estate property related matters.

HES Placement Specialists will have direct access to the same information utilized by all other professionals in that same real estate market. This includes title company profiles as well as tax and deed information at the county level and comparable property sales in the immediate area. Placement specialists will also dispatch a locally recognized home appraiser to evaluate the current status of the property identifying any outstanding issues and establish a valuation for the property at present value.

Many consumers appreciate the opportunity to research their own options while staying free of pressure that is exerted on them from commissioned sales people. The HES website will allow the consumer to independently view the main information about the HES program and answer their own questions as to the range of equity portion that they may qualify for. An on-line calculator will let them enter the assumed current value of the property as well as the remaining mortgage owed to give them a base figure of approximate equity. For example, in one exemplary application scenario, the application will use the 20% of gross value versus 50% of equity formula to compute what range of equity purchases the HES program will allow. Other equity formulas and percentage participations may be used in conjunction with the HES program without departing from the spirit and scope of the present invention.

As with many other mortgage websites, a consumer would be able to back out of a session and maintain anonymity or begin the process of learning more about a potential transaction with HES. They could make their own general application on line at this point, or simply call toll free numbers for general information or to set a workday appointment for an HES Placement Specialist to call. The option of making such a general query by e-mail or through an on-line conversation would also direct them to a 24-hour general information "scripted service," once again essentially doing a set-up for an appointment by phone or on-line with an HES Placement Specialist. The idea is to make the entire process as consumer friendly as possible and to provide all the possible investment options to the consumer so that they can make an informed decision.

The HES website would have the usual "Frequently Asked Questions" or FAQ for the on-line shoppers. A certain group of applicants and other program participants will prefer to do the initial application via FAX or even by mail. Each applicant will be free to choose the form of communication they are the most comfortable with. For purposes of conformance and satisfying the applicant, the Placement Specialist will use whatever communication medium the applicant wishes to use.

HES Placement Specialists would be specifically trained to be cognizant of many of the background issues that applicants might have or encounter during the entire process. For example, it is often important to the applicant that they are able to continue living in the home. This objective is easily accommodated by the HES program. Many older individuals that might apply to the program are unwilling to incur further mortgage debt as required with the Home Equity Loan Programs, or to lose ownership rights as is common with the "reverse mortgage program" offered to senior citizens. In certain cases, the applicant may be at the end of their income earning potential and may not qualify for a favorable second mortgage rate. They may have some apprehension and unease about disturbing the primary mortgage company and any issues regarding their income or credit that may ensue. Again, these are all objectives that are achievable with the HES program.

As mentioned earlier, many consumers borrow against a portion of those assets and equity in a home and repay a loan with interest. However, HES offers the homeowner another choice, which includes selling a portion of their existing equity and having no interest to pay and no principal to repay. The homeowner incurs no impact on their lives, living standard or use of primary residence. Additionally, thanks to a recent ruling by the Internal Revenue Service, the exclusion of gain from sale of a principal residence still applies.

By using the HES program, the investor is participating in the appreciation of the partial equity ownership that they have purchased, while at the same time, the real estate property homeowner is giving up the potential increase in market value in the portion of the homes that is being purchased by the HES program investor or investor groups. However, economic analysis has shown that a homeowner is still likely to come out ahead in using the HES program rather than borrowing against the equity in the home. The various costs (e.g. principal, interest and opportunity costs) associated with this borrowing are often higher than the average annual appreciation value or real estate over various historical time periods.

As part of implementing an HES program, a number of potential "Bridging Programs" would allow principals from the existing real estate arena to share in some of the marketing opportunities surrounding the HES program. Real estate agents are often quite aware of the progress of personal decision-making on the part of homeowners in their territory.

A homeowner may be reluctant to place their home on the market, but may instead be a strong candidate for the HES program. If that particular agent was an enrolled sales agent for the HES program, they might persuade the homeowner to apply for an HES transaction instead of placing their home on the market. For performing this service, the agent would receive some fair compensation for their efforts to stay abreast of the homeowner's needs. This allows the agent to provide a more tailored solution for their client, while at the same time providing another source of business and revenue from the agent.

Additionally, many bankers have essentially become sales people and customer representatives for the loan industry. Few banks carry their own mortgages or re-finances, with most banks choosing to sell them off to large private or government-funded national mortgage holders for a set commission payment. HES could work with these banks to offer a new product that would provide an alternative to the conventional re-fi, $2^{nd}$ mortgage or home equity line of credit. The banking establishment would receive a set commission from HES to compensate them for their efforts.

It is anticipated that the HES program would become a welcome addition to many community-oriented banking and home loan institutions. These institutions would be qualifying their customers as part of the transaction and would in effect be doing much of the work that would normally require HES staff time. Paying these institutions a commission would be a fair trade in terms of reduced staff time and incentives normally incurred and now offloaded from an HES program entity.

Marketing relationships would be developed with various lending institutions to market the HES program. HES would produce a training component to market this work efficiently and a series of handbooks and instructional videos for these marketing partners would also be created.

HES would be responsible for the initial training of these partnering institutions and would provide ongoing sales materials, legal documents and promotional brochures. For example, a ready "Plug-in" module would be available for their Home Loan web page, also provided by HES marketing. HES would also have an ongoing responsibility to provide refresher type training and keep the sales associates abreast of any updates or changes in the documents.

HES will manage all transactions for the homeowners, with the portfolio of ownership turned over to investors. In exchange for these services, HES will receive a variety of fees from the participating homeowners and the funds to produce its operating revenues.

There is another advantage of participating in an HES program. In today's world and economic climate, credit worthiness and availability of credit is important to many individuals. The HES program helps the homeowner build his credit rating by selling a portion of his property interest as a way of obtaining an interest-free influx of cash, without any debt-based entry on any credit reporting agency.

Another major advantage for homeowners in the HES program is the Federal income tax treatment. The exclusion of gain from the sale of a principal residence is available for sales of partial interests. The following example illustrates this advantage. Under a regulation promulgated by the IRS in December 2002, the sale of a minority percentage ownership in an owner-occupied single family home will not result in any current Federal income tax liability. Thus, any potential capital gains tax liability arising out of profit realized by the homeowner from a partial property interest transaction in accordance with the present invention would be deferred until there is a sale of the entire property. At that time, the deferred transaction would be folded into the total sale and the gross capital gain to the homeowner calculated at that time only.

Accordingly, should the total sale transaction fall within the current exemption for capital gains given to homeowners for the sale of their primary residence (currently about $500,000 for a married couple), then no Federal income taxes would ever have to be paid. If the total fell outside the exemption limit, then the capital gains tax liability would be incurred only at the time of the sale of the entire house.

The HES program may be implemented to continuously monitor the latest legal developments and taxable consequences relating to Federal, state and local municipalities. The HES program would then be updated to ensure conformance with all related laws and regulations, while at the same time maximizing the benefits that HES program participants are entitled to, while minimizing any harm or disadvantages that may arise in the future due to a changing legal or regulatory environment.

The HES program has set certain criteria for equity purchases to assure that the homeowner retains a significant amount of equity in their primary residence, continues to take care of it and remains responsible for full payments of all first mortgage amortization costs, all local property taxes and assessments, any and all insurance costs on the property and any and all liens of any types to assure that the homeowner continues to retain full ownership and responsibility for the property.

Candidates for the HES program would include any homeowners having significant net equity in their primary residence who might look to a conventional refinancing or securing a home equity loan or line of credit as a likely candidate to look at an HES program as an extremely attractive alternative.

In one exemplary embodiment, the application forms for homeowners would be simple, since no income or job requirement data is necessary. A conventional title search of the property would reveal all titling and lien data necessary. One example of a rule would be that HES would adhere to the rule of the lesser of 20% of the appraised value of the house, or 50% of the net equity over all mortgages to assure that the homeowner in the residence continues to have a very significant interest in the property There are preliminary parameters for operating the HES program. For example, these include a minimum and maximum allowable dollar investment in a home, a minimum and maximum percentage investment in a home, a fee schedule, a buy-back program and a time schedule for completion of each transaction.

In Example 1, the following initial parameters are:
Minimum Investment: $25,000
Maximum Investment: $300,000
Percentage Investment: The lesser of 20% of the current appraised value of the property or 50% of the net equity of the property held by the homeowner after deducting the current balance of any and all mortgages or other cash liens against the property.

Fees: HES will charge a fee of 3% of the Investment to be deducted from the homeowner's payout. Also to be paid by the homeowner will be pass through fees payable to title companies and appraisers for expenses of the transaction.

BuyBack Program: HES will offer homeowners a standing BuyBack Provision, to allow the homeowner to repurchase his Equity at the Appraised value at the time of the Buy-Back.

Time Schedule: HES will design the program to have a goal of achieving a close of escrow on each transaction within 21 days of receiving the signed application from the Homeowner.

The present invention may also be adapted to provide first trust financing. For example, the sale of a partial interest in real property may in many cases trigger the due-on-sale clause in the homeowner's mortgage. To prevent this clause from being triggered, consent to the property interest transfer may first be obtained from the mortgage holder or other lienholder. Also, if the homeowner wishes to refinance the property, the transferee of the property interest (e.g., HES or an investor) may perform the refinancing to release the first lienholder of the original mortgage. In this situation, consideration for the transfer would involve both debt and equity. Further, the transferee may partner with a bank to obtain funds for refinancing the property. As an alternative to avoid triggering a due-on-sale clause, an option or right might be utilized rather than an actual entry on the property deed.

As an incentive to further investment, the homeowner may agree to indemnify investors for the consideration paid and any financial obligations or liabilities created as a result of the transfer. This situation may arise, for example, if the homeowner were to default on his mortgage. To protect the homeowner, insurance may be obtained to cover the indemnification.

In accordance with one or more of the foregoing embodiments, HES may operate as real estate broker to enhance convenience of the transaction. In this scenario, HES would engage the parties and handle any or all qualifications required.

The previous example has been shown for purposes of illustration and it should be apparent to those of ordinary skill in the art that different minimum and maximum investments, fees, processing timelines and any other processing parameters or variables are possible without departing from the spirit and scope of the present invention.

The HES program offers a simple, efficient and economical vehicle that is simple, efficient and economical for the company to operate, and "user friendly" for both the homeowners and the institutional investors who would own the portfolio of ownership. These objectives are accomplished with any combination of proprietary software that HES will commission, as well as off-the-shelf software and business linkages with companies (e.g. title companies) whose normal business operations will be highly compatible with HES related products.

The following description outlines one exemplary embodiment of an implemented HES program. A marketing program will include direct leads from advertising in both print and electronic media, an interactive website and marketing affiliations with commercial banks and savings institutions which would normally promote second mortgage loans or home equity loans and lines of credit. Since a majority of these lending institutions never keep their own mortgages anyway, it is anticipated that they will eagerly promote the HES program as another fee-based product to offer to their customers.

An additional source of leads will be real estate professionals that desire a new source of fee income for themselves and their respective brokerage firms.

To implement an HES sales event, an individual from one of the above sources would be introduced to a placement associate (PA) for implementation. The PA would make initial contact with a homeowner and ascertain the key data points necessary to continue the process. These key data points include the address of the property, the age of the home, the homeowner's estimate of the value of the property, the existing mortgage debt on the property, the assurance that the homeowner occupies the dwelling as a principal residence and the approximate length of time that the property has been owned by the homeowner.

The PA would then check the property address via the computer link with a title company and search for any unusual property liens, possible county tax delinquencies or other data that conceivably could disqualify the property from consideration. For example, this process could be accomplished within a few hours.

Assuming the property meets HES criteria, the PA would then send an application and explanation package to the homeowner by overnight mail. The explanation package would discuss the entire process, disclose all fees, and include the full proprietary document package to effect the transaction.

The application itself would be quite simple, with disclosure requiring only minimal data about the property and the homeowner, since no credit, income or other data would be required. The homeowner will be asked to fill out the application, sign it and send it back (e.g. electronically, mail, FAX, etc.). In the alternative, in a web-based implementation of the present invention, an individual can access the HES website and fill out the application online.

Upon receipt of the signed application, the PA will conduct further background checking on the homeowner and indicate a preliminary approval of the property for participation in the HES program. The PA will then re-contact the homeowner, set an appointment for an appraisal to establish a value for the property and inform the homeowner of the range of investments possible for that property under the HES program. The PA will then send an additional form (e.g. FAX or e-mail), asking the homeowner to fill in the specific amount requested (i.e. the amount of equity that they want to sell), pending confirmation of the value of the property by a licensed appraiser.

An administrative group or other support group associated with the PA will contact the appraiser for that area and coordinate the appointment with the homeowner. Once the appraiser's report is received, the PA will forward the recommendation for that property to a decision making authority (e.g. an investment committee), which will then endorse the recommendation for that property to an investment committee. The decision making authority can make various decisions including approving the transaction, disapproving the transaction or deferring a decision until further information is provided to the HES program.

The investment committee will endorse the recommendation and select the appropriate institutional investor for that particular property. The homeowner, the title company and the institutional portfolio will be informed, and a date to close escrow on the transaction will be selected.

Once the transaction is closed, the appropriate funds dispensed, and the title company has recorded or filed the deed or other ownership alternative, the paperwork will be sent to the institutional investor as well as to the HES portfolio management department for inclusion in its respective file.

Major institutional investors, including pension funds, endowment funds, foundations and personal trust accounts that invest in equities are still adversely affected by the steep stock market declines of recent years. The HES program should be a winner and attractive alternative among institutional money managers that are oriented toward equity investing, but currently dissatisfied with the volatility of stock market equities.

There has always been a demand to invest in real estate, both from the private investment community as well as the institutional community to invest in real estate. Real Estate Investment Trusts (REITs) have become a very common investment vehicle for both private and institutional investors. However, REITs only involve commercial-type real estate investment. No owner-occupied single-family homes are known to be included in any REIT that currently exists. Unfortunately, commercial-type real estate is dramatically more volatile and dependent upon a healthy economy than is real estate based on single-family homes. Therefore, the HES program delineates a program offering minority percentage ownership of America's owner-occupied single-family residences. This program lends itself to institutional investors who want to take advantage of this safe, secure and potentially rewarding investment opportunity.

Market-Based Investment Model

In accordance with the present invention, a new type of investment model may be formed from the foregoing embodiments. In this model, partial interests in one or more residential properties are publicly or privately traded (e.g., bought, sold, or otherwise transferred) between or among investors in a market setting. The property interests are preferably bundled together to form trading entities. By way of example, one bundled entity may include partial present interests in residential property located in a zip code, census tract, same community, city, county, or state. Another bundled entity may include partial present interests in residential property categorized by price, capacity (townhouse, condominium, single-family home), amenities (beachfront, lake front, etc.), and/or any other type of classification.

Figure 11:
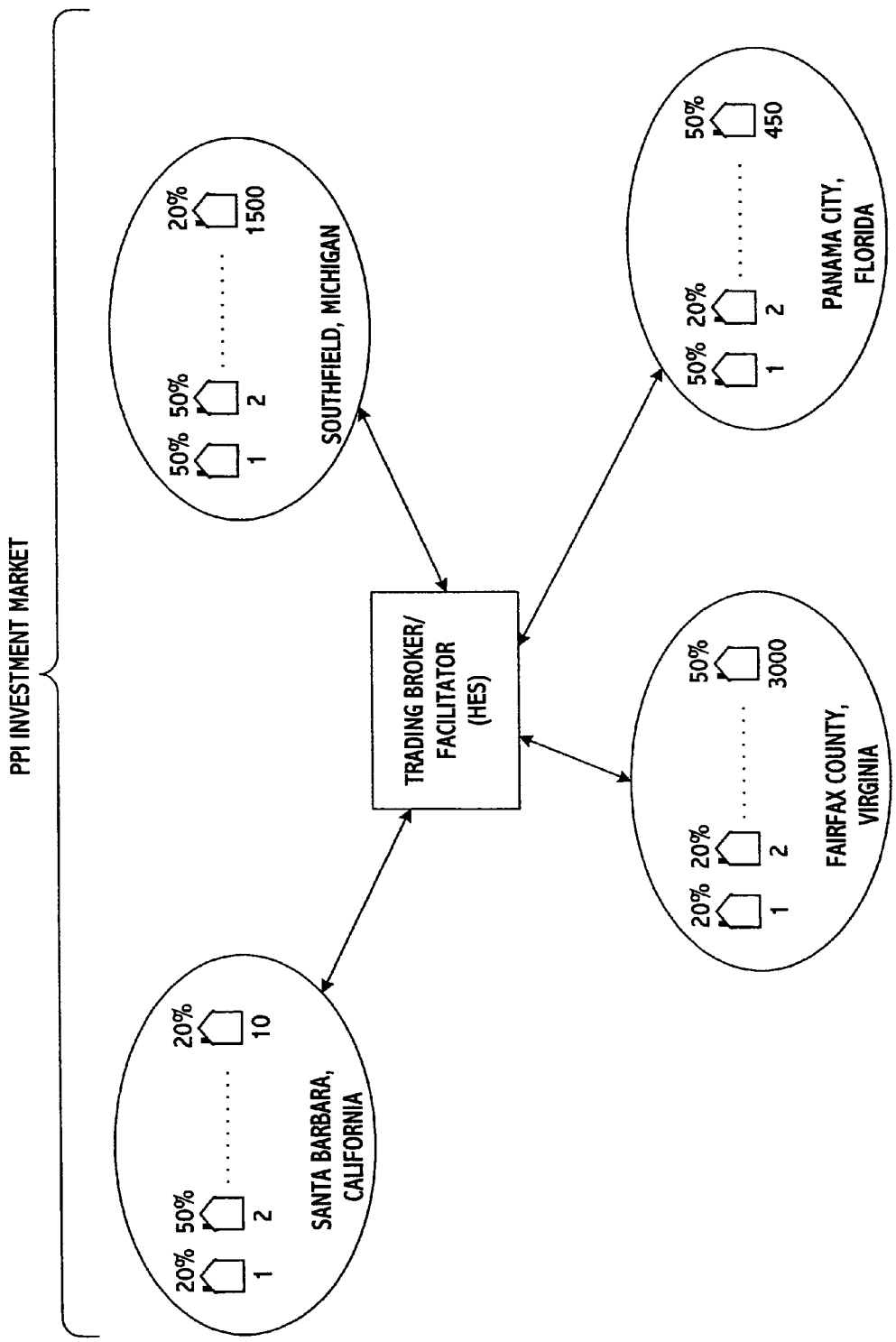
FIG. 11 is a diagram showing an investment market structure in accordance with one embodiment of the present invention.

FIG. 11 is a conceptual diagram showing how a market may be formed for trading bundled entities of partial property interests, hereinafter illustratively referred to as partial property interest (PPI) funds. In the diagram, four PPI funds are shown: the Santa Barbara fund, the Southfield fund, the Fairfax County fund, and the Panama City fund. The first fund bundles partial interests in 10 residential properties in the Santa Barbara region of the country. The second fund bundles partial interests in 1,500 residential properties in the Southfield, Mich. area. The third fund bundles partial interests in 3,000 residential properties in the Fairfax County area of Virginia. And, the fourth fund bundles partial interests in 450 properties in the Panama City, Fla. area.

Each PPI fund is owned by one or more investors seeking to obtain a profit from appreciation of the property interests in the fund. As previously described, the decision to sell each property included in the fund preferably resides solely in the homeowner. When a sale does occur, a share of the proceeds is transferred to the investor based on the partial property interest held in the fund. For example, if the owner of house #1 in the Santa Barbara fund sells, a pro rata portion of the proceeds is transferred to the investor who owns the Santa Barbara fund and the property holdings in the fund is reduced by one (i.e., the fund includes partial interests in the remaining nine properties after the sale of house #1).

Figure 12:
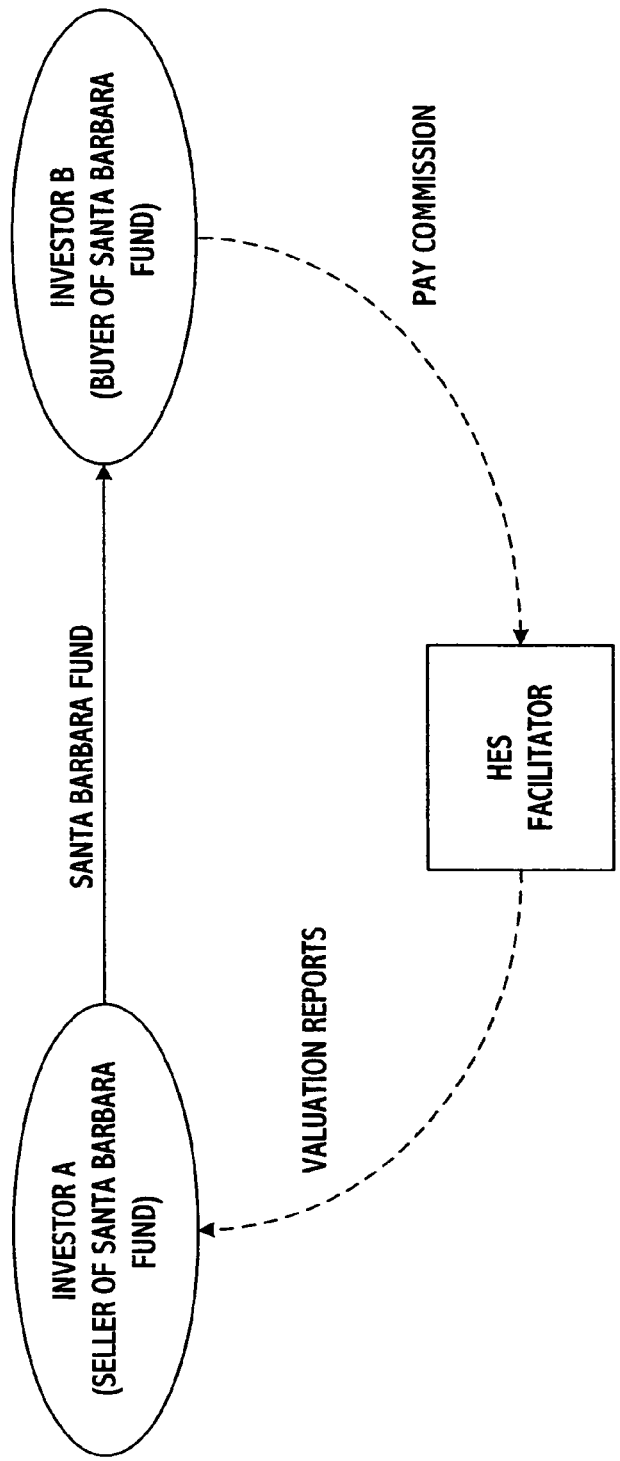
FIG. 12 is a diagram showing one way in which a trade may be performed in the investment market of the present invention.

While investors do not have a right to sell the properties connected with their funds (by virtue of their agreed-upon waiver), they do have the right to sell their funds to other investors. FIG. 12 depicts this scenario, where Investor A sells the Santa Barbara fund to Investor B in exchange for some form of consideration, e.g., cash, cash equivalent, debt satisfaction, and/or some other asset or combination of assets. PPI funds are preferably sold at their owners' discretion. For example, Investor A may determine that a 10% appreciation in the value of the Santa Barbara fund is a sufficient return on investment. Investor B may determine, however, that the property in the Santa Barbara fund may potentially increase by another 20%. Both parties therefore potentially benefit from the trade.

The present invention thus allows for the formation a new type of investment market where (instead of, for example, stocks) PPI funds are traded between investors in a way that provides substantial benefit to all concerned. For the investor, a new low-risk, potentially high-yield equity is offered which is more flexible than other investment options, including REITs which are based on ownership of whole interests in property, are inflexible investments, and come with considerable less favorable tax consequences than PPI funds. For the homeowner, PPI funds provide a source of capital which is obtained free from debt and comes with no constraints on use, all while allowing the homeowner to occupy, manage, and retain full control of the property. And, for the facilitator (e.g., HES) a business model is created whereby fees and commissions are collected from facilitating trades, managing investor PPI fund portfolios, providing periodic fund valuation reports, as well as other investor/investment-based services.

PPI fund trades may be facilitated in any one of a variety of ways FIG. 13 shows one way which involves a computerized network (e.g., an Internet website) which posts recent PPI trades and their associated sale price, PPI funds available for sale, offers for sale of specific funds, as well as other information subject to regulation by the SEC or other type of governmental oversight entity. The website may be managed by the facilitator (HES) and trades may be made by subscriber-investors who have an account number and password. The sale and purchase of a specific fund may then proceed in a manner analogous to an on-line stock purchase, with an agreed-upon or percentage commission being charged to the buyer and/or seller. Portfolio valuations, trade history information, periodic (e.g., end-of-year) tax reports, and other investment-related information may be offered to subscribers for a premium.

Valuations may be performed using any one of a variety of models encoded, for example, into proprietary software. Examples include venture-capital models, collectibles models, modified REIT-valuation models, etc. The valuations produced from these models may, for example, be based on neighborhood comparables available from real estate databases. For example, all ten properties in the Santa Barbara fund may be located in the same neighborhood. The sale prices of the three last properties sold in the neighborhood (outside the fund) may be used as a basis for valuing the properties and thus the ten interests in the fund.

For the convenience of the investor, each homeowner may be required to waive the right to consent to subsequent transfers of the partial interest sold, e.g., if the homeowner sells a 20% interest in his home to an investor, the investor may resell that interest at any time without the consent of the homeowner. Also, the facilitator, homeowner, or investor may make arrangements with the lienholder (e.g., mortgagee) of the property to agree to waive the due-on-sale clause for any interest in the property sold to a PPI fund by the homeowner and subsequently sold by a PPI fund investor. Alternatively, the original mortgage may be taken by the homeowner with this understanding from the mortgagee. Preparation and recordation of new deeds or other ownership alternatives generated from each sale or trade may be performed by the facilitator.

In the event that a waiver from the mortgagee is not possible, each trade may trigger a due-on-sale clause in the properties included in the fund. As part of its investor services, the facilitator (HES) may undertake obtaining new financing for the properties, performing all required re-valuations, etc.

While each fund shown in FIG. 11 has been described as bundling interests in properties located in the same geographic area, other PPI funds may be developed which combine interests in properties from different areas. For example, a PPI fund called the high-income fund may combine property interests from all across the country for homes that are valued in the range $5,000,000-$10,000,000. Funds in other price categories may also be created. In accordance with one particularly advantageous feature, the PPI fund market may offer/compute a number of indexes as a basis of allowing investors to gauge market performance. One or more index funds may then be created and sold based on these indices.

Another way in which trades may occur in PPI fund market is by indirect transfer. Instead of directly transferring property interests between investors during a trade (which may necessitate execution and recordation of new deeds or other ownership alternatives for each property in the fund), ownership of property interests in a fund is retained by a holding company. Then, trades are effectively performed by selling shares of stock in the holding company.

Figure 14:
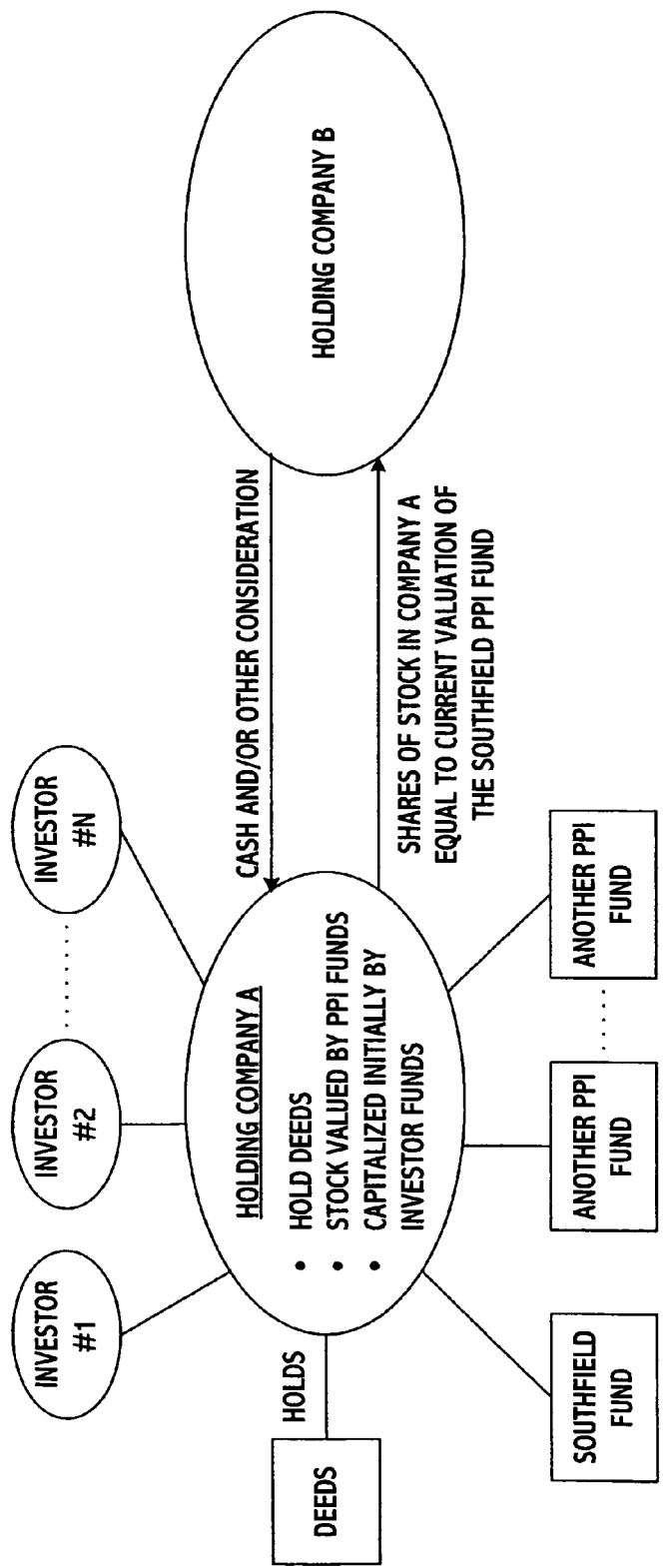
FIG. 14 is a diagram showing an investment market structure in accordance with another embodiment of the present invention.

FIG. 14 is a conceptual diagram outlining how this type of market may be structured. In this diagram, two holding companies are shown. Holding Company A owns the Southfield PPI fund as well as other funds B and C, and also retains the deeds (or other ownership alternative) for each of the funds properties. The stock in Holding Company A is valued based on the valuations of the funds it owns. To effectively trade the Southfield fund to Holding Company B, Holding Company A sells a number of shares of stock commensurate with the value of the Southfield fund at that time. The transfer of stock (instead of property deeds) makes this market model embodiment of the present invention very attractive from the mortgagee's standpoint (because title in the deeds remains in Holding Company A and thus no due-on-sale clauses are triggered). The sale of stock is also more convenient from an administrative standpoint and is potentially easier to value than former embodiments, which would require valuations of the hundreds or thousands of properties in the fund on a periodic basis. Start-up capital for each holding company may be provided by one or more investors, denoted Investor # 1, Investor # 2, . . . , Investor # N in FIG. 14.

The concept embodied in FIG. 14 is only one example of a number of alternative methods which may be employed in avoiding execution of deeds as a condition to a partial ownership transfer in accordance with the present invention.

The one or more embodiments described herein may include a number of options. For example, while one embodiment has heretofore been described as allowing an investor to retain a right to consent to the sales price of a property, alternative embodiments contemplate giving no such right to the investor, i.e., the homeowner may be given full control over when to sell and at what price. In order to protect investor interests, an exception may be put into effect if the homeowner attempts to sell the property for a price substantially below fair market value. This may arise, for example, when the homeowner attempts to sell the property to a relative. To protect the investor interests, the homeowner may be required to agree that when a below-market value sale occurs, no distribution of proceeds is triggered. Rather, the investor's interests remain in the property, now held by the new owner.

Also, in any of the foregoing embodiments the investor purchasing the partial property interest or PPI fund can waive the right to receive proceeds from the property sale in exchange for the buyer's agreement to allow the investor to retain his or her partial interest in the property. For example, consider the case where the investor owns a 20% share in the property and the property sells for $300,000. In this alternative embodiment of the invention, the investor will waive his right to receive the $60,000 (equal to his 20% interest) pro rata portion of the sale proceeds in exchange for the buyer's promise (e.g., executed in a legally binding agreement) to allow the investor's 20% interest to continue in the property.

This is particularly advantageous to home buyers because it will reduce the amount of money for home purchases. Thus, in the foregoing example, the buyer only has to come up with financing for $240,000 because of the 20% interest retained by the investor in the property. This lower purchase price will likely greatly stimulate investment in the housing market while simultaneously allowing investors to reap potentially greater profits as a result of a longer term of property ownership where values tend to go up with time.

In the agreement discussed herein, the investor may waive a right to receive a pro rata deduction of Federal, state, or local income taxes as a result of the ownership interest obtained by the investor from a partial interest sale.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A computer-implemented method for managing a partial equity interest in a residential real estate property, comprising:
   receiving via a data interface executing on a computer processor information for a real estate property transaction wherein the real estate property transaction is associated with a residential property that is homeowner occupied;
   creating a partial equity interest in the residential property by transforming with the computer processor, the information relating to the residential property into the partial equity interest, wherein the partial equity interest is associated with a non-debt related investment between the homeowner and the investor, wherein the partial equity interest in the residential property does not obligate the homeowner to repay an investment made by the investor at anytime prior to a sale of the residential property, the creation of the partial equity interest comprising:
      the homeowner obtaining value for the partial equity interest; the homeowner retaining right to continue to receive one or more tax advantages of ownership of the residential property;
      the homeowner retaining right of residency of the residential Property and right to determine when to sell the residential property;

the homeowner having an obligation to pay one or more of real estate taxes, mortgage payments, insurance, and up keep expenses associated with the residential property;

the investor waiving right to control and sale of the residential property, while retaining rights to approve a sales price of the residential property; and the investor collecting a share of proceeds from the sale of the residential property based on the partial equity interest;

receiving information associated with selling the partial equity interest to the investor;

storing information about the partial equity interest in a computer memory; and filing documents that are related to the partial equity interest and making the documents of record.

2. The method of claim 1, wherein selling the partial equity interest creates a concurrent estate in land possessed by two or more holders of the partial equity interest.

3. The method of claim 1, wherein direct and indirect participation is permitted in the real estate property transaction.

4. The method of claim 1, wherein the information includes ownership information, appraised value of the residential property, a specific amount of partial equity interest intended to be sold and a listing of all parties involved in the real estate property transaction.

5. The method of claim 1, further comprising checking for completeness or incompleteness of an application and determines if the real estate property transaction should proceed or not proceed.

6. The method of claim 1, wherein selling the partial equity interest in a home allows the homeowner to receive a federal tax deferral on that sale, sell the rest of the home later under a lumped-sum transaction rule, and continue to live in the home.

7. The method of claim 1, wherein the homeowner remains responsible for property associated expenses including property taxes, mortgage payments, insurance and general operating expenses associated with the residential property.

8. The method of claim 1, further comprising an entity that receives fees associated with the creation of the partial equity interest, the fees including at least one of a placement commission, an annual fee, and a performance fee as compensation for services provided.

9. The method of claim 1, further comprising a processing step that includes structuring the real estate property transaction in a manner to avoid the payment of interest and the payment of principal upon sale of the partial equity interest.

10. The method of claim 1, further comprising accounting for the value of improvements made by the homeowner in the residential property.

11. The method of claim 1, wherein when selling the partial equity interest in the residential property is executed, processing is performed to minimize taxable consequences.

12. The method of claim 1, further comprising checking for information including any title, liens or appraisals that exist on the residential property.

13. The method of claim 1, further comprising processing a standard home equity loan or line of credit based upon the existing equity in the residential property.

14. The method of claim 1, further comprising ensuring that an entity has final approval authority on any aspect of the real estate property transaction affecting the entity's interests, including the sale of the residential property.

15. The method of claim 1, further comprising that a payback of the partial equity interest is due upon final sale of the residential property.

16. The method of claim 1, further comprising accommodating transferred funds including cash, cash equivalents, warrants, options, financial derivatives and debt instruments.

17. The method of claim 1, further comprising tracking the partial equity interest as a percentage of the total value of the residential property sold.

18. The method of claim 1, wherein upon sale of the residential property, an entity receives a percentage of the appraised value of the residential property.

19. The method of claim 1, further comprising tracking the partial equity interest as a dollar value.

20. The method of claim 1, wherein upon sale of the residential property, an entity receives an adjusted dollar value representing a value of the partial equity interest.

21. The method of claim 1, wherein the parties involved in the partial equity interest include at least one of title companies, mortgage companies, real estate agents and brokers, institutional investors, private investors, pension funds, mutual fund companies, commercial developers, residential developers, and title companies.

22. The method of claim 1, further comprising monitoring changes including legal, tax, and property status that affect the partial equity interest and any interests of the parties involved.

23. The method of claim 1, further comprising evaluating local state law and structuring the partial equity interest in a manner to avoid any due on sale clause that is triggered by the creation of the partial equity interest.

24. The method of claim 1, wherein an entity will manage one or more real estate property transactions associated with one or more partial equity interests for one or more homeowners and in exchange, the entity receives a plurality of fees from one or more homeowners.

25. The method of claim 1, further comprising creating and maintaining a real estate property database, and the database includes owner information, property addresses, appraised values, changes in the appraised values over time, total equity interest in the residential property and the partial equity interest that has been sold.

* * * * *

UNITED STATES PATENT AND TRADEMARK OFFICE
CERTIFICATE OF CORRECTION

| | | |
|---|---|---|
| PATENT NO. | : 8,725,616 B2 | Page 1 of 1 |
| APPLICATION NO. | : 12/077404 | |
| DATED | : May 13, 2014 | |
| INVENTOR(S) | : Schneider | |

It is certified that error appears in the above-identified patent and that said Letters Patent is hereby corrected as shown below:

In the Specification

Column 2, line 47, please change "tide" to -- title --.

Column 4, line 57, please change "may," to -- may --.

Column 6, line 59, please change "real-estate" to -- real estate --.

Column 8, line 9, please change "tide" to -- title --.

In the Claims

Column 22, line 54, Claim 1, after "with" please insert -- at least --.

Column 22, lines 55-59, Claim 1, after "investor," please delete "wherein the partial equity interest in the residential property does not obligate the homeowner to repay an investment made by the investor at anytime prior to a sale of the residential property,".

Column 22, line 66, Claim 1, please change "Property" to -- property --.

Column 24, line 19, Claim 17, after "value of the" please insert -- real estate --.

Signed and Sealed this
Ninth Day of December, 2014

Michelle K. Lee
*Deputy Director of the United States Patent and Trademark Office*